US011128560B2

(12) United States Patent
Joshi et al.

(10) Patent No.: US 11,128,560 B2
(45) Date of Patent: Sep. 21, 2021

(54) DATA CENTER FAILURE MANAGEMENT IN AN SDN DEPLOYMENT USING SWITCHING NODE CONTROL

(71) Applicant: TELEFONAKTIEBOLAGET LM ERICSSON (PUBL), Stockholm (SE)

(72) Inventors: Vinayak Joshi, Bangalore (IN); Ashvin Lakshmikantha, Bangalore (IN); Vivek Srivastava, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/961,681

(22) PCT Filed: Jan. 12, 2018

(86) PCT No.: PCT/IN2018/050017
§ 371 (c)(1),
(2) Date: Jul. 11, 2020

(87) PCT Pub. No.: WO2019/138414
PCT Pub. Date: Jul. 18, 2019

(65) Prior Publication Data
US 2021/0083967 A1    Mar. 18, 2021

(51) Int. Cl.
*H04L 12/707* (2013.01)
*H04L 12/28* (2006.01)
*H04L 12/24* (2006.01)
*H04L 12/26* (2006.01)
*H04L 12/717* (2013.01)

(52) U.S. Cl.
CPC .......... *H04L 45/24* (2013.01); *H04L 12/2861* (2013.01); *H04L 41/0659* (2013.01); *H04L 43/026* (2013.01); *H04L 45/42* (2013.01)

(58) Field of Classification Search
None
See application file for complete search history.

(56) References Cited

U.S. PATENT DOCUMENTS

| 7,088,718 | B1 | 8/2006 | Srivastava |
| 10,791,059 | B2 | 9/2020 | Liang et al. |
| 2013/0266007 | A1 | 10/2013 | Kumbhare et al. |

(Continued)

FOREIGN PATENT DOCUMENTS

EP     3264691 A1     1/2018

OTHER PUBLICATIONS

R. Fernando et al., "Service Chaining using Virtual Networks with BGP VPN", draft-ietf-bess-service-chaining-00, BGP Enabled Services (bess), INTERNET-DRAFT, Apr. 13, 2016, 41 pages.

*Primary Examiner* — Brian Whipple

(57) ABSTRACT

A data center failure management system and method in a Software Defined Networking (SDN) deployment. In one embodiment, an SDN controller associated with the data center is configured to learn new flows entering the data center and determine which flows require flow stickiness. Responsive to the determination, the SDN controller generates commands to one or more switching nodes and/or one or more border gateway nodes to redirect the sticky flows arriving at the switching nodes via ECMP routes from the gateway nodes or avoid the ECMP routes by the gateway nodes in order to overcome certain failure conditions encountered in the data center, an external network, or both.

23 Claims, 21 Drawing Sheets

(56) References Cited

U.S. PATENT DOCUMENTS

| | | |
|---|---|---|
| 2013/0329601 A1 | 12/2013 | Yin et al. |
| 2015/0312155 A1 | 10/2015 | Anand et al. |
| 2016/0006654 A1* | 1/2016 | Fernando ................ H04L 45/36 370/392 |
| 2017/0214713 A1 | 7/2017 | Doron et al. |
| 2018/0219783 A1* | 8/2018 | Pfister .................. H04L 47/125 |
| 2020/0336420 A1* | 10/2020 | Joshi ...................... H04L 45/74 |

* cited by examiner

DATA CENTER FAILURE MANAGEMENT IN AN SDN DEPLOYMENT USING SWITCHING NODE CONTROL

TECHNICAL FIELD

The present disclosure generally relates to communications networks. More particularly, and not by way of any limitation, the present disclosure is directed to a system and method for managing data center failures in a Software Defined Networking (SDN) deployment using switching node control.

BACKGROUND

Demand for dynamic scaling and benefits from economies of scale are driving the creation of mega data centers to host a broad range of services such as Web search, e-commerce, storage backup, video streaming, high-performance computing, and data analytics, to name a few. To host these applications, data center networks need to be scalable, efficient, fault tolerant, and easy-to-manage. Recognizing this need, the research community has proposed several architectures to improve scalability, reliability and performance of data center networks, e.g., deployment of redundant network nodes, load balancing, using Equal Cost Multi Path (ECMP) routing and failover, etc.

Technologies such as Software Defined Networking (SDN) and Network Function Virtualization (NFV) are transforming traditional networks into software programmable domains running on simplified, lower cost hardware, driving the convergence of IT and telecom markets. This convergence is expected to overhaul network operations, enable new services and business models, and impact existing data center solutions.

Whereas advances in technologies such as SDN, NFV, and cloud-based service hosting continue to grow apace, several lacunae remain in the field of data center failure management, thereby requiring further innovation as will be set forth hereinbelow.

SUMMARY

The present patent disclosure is broadly directed to systems, methods, apparatuses, devices, and associated non-transitory computer-readable media and network architecture for effectuating a failure management system and method operative in a data center with SDN architecture. In one embodiment, an SDN controller associated with the data center is configured to learn new flows entering the data center and determine which flows require flow stickiness. Responsive to the determination, the SDN controller generates commands to one or more switching nodes and/or one or more border gateway nodes of the data center to redirect the sticky flows arriving at the switching nodes via ECMP routes from the gateway nodes or avoid the ECMP routes by the gateway nodes in order to overcome certain failure conditions encountered in the data center, an external network coupled to the data center, or both.

In one aspect, an embodiment of a method operating at an SDN controller associated with a data center having a plurality of switching nodes coupled in a data center network fabric to a plurality of gateway nodes is disclosed. The claimed method comprises, inter alia, receiving a first packet of a packet flow from a first switching node coupled to a service instance hosted by the data center, the packet flow having with an n-tuple identifier set and flowing from a gateway node pursuant to a subscriber session via an external network. Responsive to determining or otherwise obtaining information that the packet flow requires flow stickiness with respect to the subscriber session, the SDN controller is configured to compute bypass routing paths for the packet flow and advertise the routing paths to the gateway nodes using Border Gateway Protocol (BGP) Flow Specification (BGP-FS), wherein the bypass routing paths identify the first switching node having flow stickiness as the routing destination.

In one variation, the claimed method further comprises generating instructions to the plurality of switching nodes to forward first packets of new packet flows respectively received thereat to the SDN controller, the first packets each containing respective n-tuple identifier sets. In another variation, the bypass routing paths for the packet flow advertised to the gateways nodes using BGP-FS are accorded a higher priority than ECMP routing paths with load balancing.

In another aspect, an embodiment of an SDN controller associated with a data center having a plurality of switching nodes coupled in a data center network fabric to a plurality of gateway nodes is disclosed. The claimed SDN controller comprises, inter alia, one or more processors, and a persistent memory module coupled to the one or more processors and having program instructions thereon, which when executed by the one or more processors perform the following: generate instructions to the plurality of switching nodes to forward first packets of new packet flows respectively received thereat to the SDN controller, the first packets each containing respective n-tuple identifier sets; responsive to the instructions, receive a first packet of a packet flow from a first switching node coupled to a service instance hosted by the data center, the packet flow having with an n-tuple identifier set and flowing from a gateway node pursuant to a subscriber session via an external network; determine or obtain information that the packet flow requires flow stickiness with respect to the subscriber session; and responsive thereto, computing routing paths for the packet flow and advertising the routing paths to the gateway nodes using BGP-FS, the routing paths having a switching node destination pointing to the first switching node having flow stickiness.

In another aspect, an embodiment of a method operating at a gateway node of a data center having a plurality of switching nodes coupled in a data center network fabric to a plurality of gateway nodes and controlled by an SDN controller is disclosed. The claimed method comprises, inter alia, receiving routing paths from the SDN controller advertised using BGP-FS for a plurality of packet flows each having an n-tuple identifier set associated therewith, wherein each routing path identifies a switching node as a destination for a corresponding packet flow. A matching Forward Information Base (FIB) (also referred to as FS-FIB) is populated or installed with the routing paths advertised via BGP-FS from the SDN controller. When packets arrive at the gateway node for a particular packet flow pursuant to a subscriber session via an external network, the particular packet flow having a particular n-tuple identifier set, a determination is made as to whether the particular n-tuple identifier set of the particular packet flow matches an entry in the matching FIB. If so, the packets of the particular packet flow are forwarded to a corresponding switching node identified in the routing path associated with the particular n-tuple identifier set instead of routing the particular packet flow according to an ECMP path computation. In one variation, the claimed gateway method further includes, responsive to determining that the particular n-tuple identifier set of the particular packet flow does not have an entry in the matching FIB, forwarding the packets of the particular packet flow to a Longest Prefix Match (LPM) Forwarding Base (FIB) for determining an ECMP routing path to a switching node of the data center.

In a related aspect, an embodiment of a gateway node associated with a data center having a plurality of switching nodes coupled in a data center network fabric and controlled by an SDN controller is disclosed. The gateway node comprises, inter alia, one or more processors, and a persistent memory module coupled to the one or more processors and having program instructions thereon, which perform the following when executed by the one or more processors: populating a matching forward information base (FIB) with routing paths from the SDN controller advertised using BGP-FS for a plurality of packet flows each having an n-tuple identifier set associated therewith, wherein each routing path identifies a switching node as a destination for a corresponding packet flow; receiving packets at the gateway node for a particular packet flow pursuant to a subscriber session via an external network, the particular packet flow having a particular n-tuple identifier set; determine if the particular n-tuple identifier set of the particular packet flow matches an entry in the matching FIB; and if so, forward the packets of the particular packet flow to a corresponding switching node identified in the routing path associated with the particular n-tuple identifier set instead of routing the particular packet flow pursuant to an ECMP path. In one variation, the gateway node further includes program instructions configured, responsive to determining that the particular n-tuple identifier set of the particular packet flow does not have an entry in the matching FIB, to forward the packets of the particular packet flow to an LPM FIB for determining an ECMP routing path to a switching node of the data center. In another variation, the gateway node further comprises program instructions for deleting the entry corresponding to the particular n-tuple identifier set of the particular packet flow from the matching FIB responsive to at least one of a command from the SDN controller, reaching a timeout value, and determining that the subscriber session has been terminated.

In a still further aspect, an embodiment of a method operating at an SDN controller associated with a data center having a plurality of switching nodes coupled in a data center network fabric to a plurality of gateway nodes is disclosed. The claimed method comprises, inter alia, receiving a first packet of a packet flow from a first switching node coupled to a service instance hosted by the data center, the packet flow having with an n-tuple identifier set and flowing from a gateway node pursuant to a subscriber session via an external network and determining or obtaining information that the packet flow requires flow stickiness with respect to the subscriber session. Responsive thereto, the method operates by programming each switching node (e.g., preferably other than the first switching node) to redirect any packets of the packet flow received by the switching nodes to the first switching node, the packets arriving at the switching nodes from at least a subset of the plurality of gateway nodes according to respective ECMP routing paths. In one variation, the method further includes programming each switching node by the SDN controller to redirect the packets of the packet flow by sending one or more OpenFlow specification match-action rules to the switching nodes that identify the first switching node as a destination node for that n-tuple flow. In another variation, the method further includes generating instructions to the plurality of switching nodes to forward first packets of new packet flows respectively received thereat to the SDN controller, the first packets each containing respective n-tuple identifier sets.

In another aspect, an embodiment of an SDN controller associated with a data center having a plurality of switching nodes coupled in a data center network fabric to a plurality of gateway nodes is disclosed. The claimed SDN controller comprises, inter alia, one or more processors, and a persistent memory module coupled to the one or more processors and having program instructions thereon, which when executed by the one or more processors perform the following: generate instructions to the plurality of switching nodes to forward first packets of new packet flows respectively received thereat to the SDN controller, the first packets each containing respective n-tuple identifier sets; responsive to the instructions, receive a first packet of a packet flow from a first switching node coupled to a service instance hosted by the data center, the packet flow having with an n-tuple identifier set and flowing from a gateway node pursuant to a subscriber session via an external network; determine that the packet flow requires flow stickiness with respect to the subscriber session; and responsive to the determining, program each switching node (e.g., preferably other than the first switching node) to redirect any packets of the packet flow received by the switching nodes to the first switching node, the packets arriving at the switching nodes from at least a subset of the plurality of gateway nodes according to respective ECMP routing paths. In a related variation, the SDN controller further includes program instructions configured to program the switching nodes by sending one or more OpenFlow specification match-action rules that identify the first switching node as a destination node.

In a still further aspect, an embodiment of a method operating at a switching node of a data center having a plurality of switching nodes coupled in a data center network fabric to a plurality of gateway nodes and controlled by an SDN controller is disclosed. The claimed method comprises, inter alia, forwarding first packets of new packet flows received at the switching node to the SDN controller, the first packets each containing respective n-tuple identifier sets of corresponding packet flows and flowing from one or more gateway nodes pursuant to respective subscriber sessions via an external network; populating a flow identification database for identifying the new packet flows as they arrive at the switching node; receiving packets at the switching node for a particular packet flow pursuant to a subscriber session via an external network, the particular packet flow having a particular n-tuple identifier set; determining that the particular packet flow is not a new packet flow by comparing the particular n-tuple identifier set of the particular packet flow against the flow identification database; responsive to the determining, applying a programming rule provided by the SDN controller with respect to the particular packet flow, the programming rule operating to identify a destination switching node other than the switching node receiving the particular packet flow; and redirecting the packets of the particular packet flow to the destination switching node identified according to the programming rule. In one variation, the programming rule comprises at least one match-action rule provided by the SDN controller according to OpenFlow specification.

In a related aspect, an embodiment of a switching node associated with a data center having a plurality of gateway nodes and a plurality of switching nodes coupled in a data center network fabric and controlled by an SDN is disclosed. The claimed switching node comprises, inter alia, one or more processors, and a persistent memory module coupled to the one or more processors and having program instructions thereon, which perform the following when executed by the one or more processors: forward first packets of new packet flows received at the switching node to the SDN controller, the first packets each containing respective n-tuple identifier sets of corresponding packet flows and flowing from one or more gateway nodes pursuant to respective subscriber sessions via an external network; populate a flow identification database for identifying the new packet flows as they arrive at the switching node; receive packets at the switching node for a particular packet flow pursuant to a subscriber session via an external network, the particular packet flow having a particular n-tuple identifier set; determine that the particular packet flow is not a new packet flow by comparing the particular n-tuple identifier set of the particular packet flow against the flow identification database; responsive to the determining, apply a programming rule provided by the SDN controller with respect to the particular packet flow, the programming rule operating to identify a destination switching node other than the switching node receiving the particular packet flow; and redirect the packets of the particular packet flow to the destination switching node identified according to the programming rule.

In still further aspects, an embodiment of a system, apparatus, or network element is disclosed which comprises, inter alia, suitable hardware such as processors and persistent memory having program instructions for executing an embodiment of any of the methods set forth herein.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, and the like, mutatis mutandis. Further features of the various embodiments are as claimed in the dependent claims.

Example embodiments set forth herein advantageously provide improved failure management in scalable data center environments. Since standards-based solutions are effectuated using, e.g., BGP and OpenFLow specifications, an embodiment of the present invention may be readily deployed without requiring expensive hardware/software mirroring while accommodating current ECMP based implementations. Further, example embodiments also avoid complex state synchronization required in some of the existing data center technologies. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
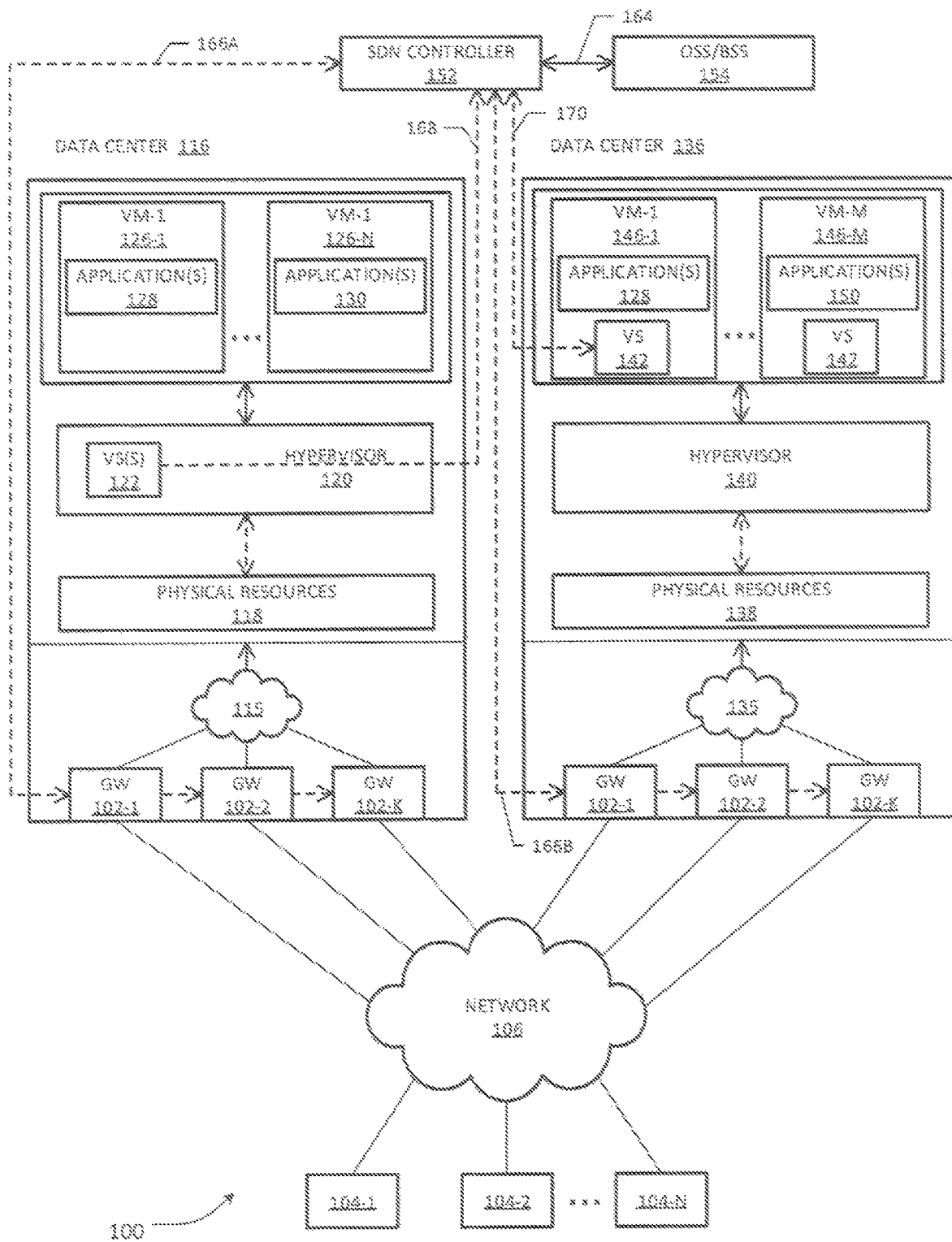
FIG. 1 depicts a generalized data center network environment wherein one or more embodiments of the present invention may be practiced.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). Subscriber/tenant end stations (e.g., servers, workstations, laptops, netbooks, palm tops, mobile phones, smartphones, tablets, phablets, multimedia phones, Voice Over Internet Protocol (VoIP) phones, user equipment, terminals, portable media players, GPS units, gaming systems, set-top boxes, etc.) may access or consume resources/services, including cloud-centric resources/services, provided over a multi-domain, multi-operator heterogeneous network environment, including, e.g., a packet-switched wide area public network such as the Internet via suitable service provider access networks, wherein a data center may be managed according to one or more embodiments set forth hereinbelow. Subscriber/tenant end stations may also access or consume resources/services provided on virtual private networks (VPNs) overlaid on (e.g., tunneled through) the Internet. Typically, subscriber/tenant end stations may be coupled (e.g., through customer/tenant premises equipment or CPE/TPE coupled to an access network (wired or wirelessly)) to edge network elements, which are coupled (e.g., through one or more core network elements) to other edge network elements, and to cloud-based data center elements with respect to consuming hosted resources/services according to service management agreements, contracts, etc.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element and/or a management node, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized data center (DC) network environment 100 wherein one or more embodiments of the present invention with respect to managing data center failures may be practiced. By way of illustration, a plurality of subscribers and/or associated end stations or user equipment (UE) devices 104-1 to 104-N are connected to a packet-switched network 106 (e.g., the Internet) for accessing cloud-based resources, services and applications (e.g., data/media/video applications, storage/compute/network resources, etc.) disposed in one or more data centers 116, 136. In one arrangement, the cloud-based data centers 116, 136 may be provided as part of a public cloud, a private cloud, or a hybrid cloud, and for facilitating subscriber sessions with respect to the consumption of one or more hosted services, applications and/or resources using any combination of end stations 104-1 to 104-N. Further, data centers 116/136 may be architected using Software Defined Networking (SDN) infrastructure and/or network function virtualization architecture, e.g., operating with protocols such as, without limitation, OpenFlow (OF) protocol, Forwarding and Control Element Separation (ForCES) protocol, OpenDaylight protocol, Multiprotocol Border Gateway Protocol (MP-BGP), and the like, with respect to providing overall management and control of various data center nodes, elements, functions, service instances, etc. An example SDN architecture typically involves separation and decoupling of the control and data forwarding planes of the network elements, whereby network intelligence and state control may be logically centralized and the underlying network infrastructure is abstracted from the applications. One implementation of an SDN-based network architecture may therefore comprise a network-wide control platform, executing on or more servers, which is configured to oversee and control a plurality of data forwarding nodes such as routers, switches, etc. Accordingly, a standardized interfacing may be provided between the network-wide control platform (which may be referred to as "SDN controller" 152 for purposes of some embodiments of the present patent application) and various components of data centers 116, 136, thereby facilitating high scalability, flow-based traffic control, multi-tenancy and secure infrastructure sharing, virtual overlay networking, efficient load balancing, and the like. In an example network environment, SDN controller 152 may be interfaced with suitable internal and/or external management layer entities such as, e.g. Operations Support Systems (OSS) and/or Business Support Systems (BSS), customer/subscriber policy management systems, content provider policy management systems, etc. A management interface 164 between SDN controller 152 and such management nodes 154 may facilitate service provisioning, Quality of Service (QoS) and Class of Service (CoS) requirements, etc., with respect to different services and subscriber flows.

As SDN-compatible environments, data centers 116, 136 may be implemented in an example embodiment as an open source cloud computing platform for public/private/hybrid cloud arrangements, e.g., using OpenStack and Kernel-based Virtual Machine (KVM) virtualization schemes. Example data center virtualization may involve providing a virtual infrastructure for abstracting or virtualizing a large array of physical resources such as compute resources (e.g., server farms based on blade systems), storage resources, and network/interface resources, wherein specialized software called a Virtual Machine Manager (VMM) or hypervisor allows sharing of the physical resources among one or more virtual machines (VMs) or guest machines executing thereon. Each VM or guest machine may support its own OS and one or more instances of services, applications, etc., and one or more VMs may be logically organized into a Virtual Extensible LAN (VxLAN) using an overlay technology (e.g., a VLAN-like encapsulation technique to encapsulate MAC-based OSI Layer 2 Ethernet frames within Layer 3 UDP packets) for achieving further scalability. By way of illustration, data centers 116 and 136 are exemplified with respective physical resources 118, 138 and VMM or hypervisors 120, 140, and respective plurality of VMs 126-1 to 126-N and 146-1 to 146-M that are logically connected in respective VxLANs 124 and 144. As a further illustration, each VM may support one or more instances of services/applications, e.g., generally, application(s) 128 executing on VM 126-1 and application(s) 130 executing on VM 126-N in respect of data center 116 and application(s) 148 executing on VM 146-1 and application(s) 150 executing on VM 146-M in respect of data center 136.

Example data centers 116, 136 may also be provided with different types of hypervisor deployment schemes depending on virtualization. Hypervisors 120, 140 may be deployed either as a Type I or "bare-metal" installation (wherein the hypervisor communicates directly with the underlying host physical resources) or as a Type II or "hosted" installation (wherein the hypervisor may be loaded on top of an already live/native OS that communicates with the host physical infrastructure). Regardless of the hypervisor implementation, each data center 116, 136 may be provided with a plurality of SDN-compatible virtual switches or switching nodes 122, 142 (e.g., OpenFlow vSwitch or OVS nodes in one example implementation, as noted further below) that may be configured for facilitating access to service instances with respect to the packet flows routed from a plurality of data center border nodes such as gateway routers 102-1 to 102-K via an internal network fabric 115, 135. In one arrangement, a data center's VS nodes may be deployed as part of its hypervisor, e.g., as illustrated in data center 116. In another arrangement, VS nodes may be provided as part of respective VMs or guest machines executing thereon, as illustrated in data center 136. With respect to the latter configuration, it should be appreciated that in some instances a VM's OS may or may not include the capability to support a virtual switch (or specifically an OVS), and accordingly, a VM-based OVS configuration may be somewhat constrained by the OS capabilities. Control paths 166A, 166B exemplify BGP-based messaging paths between SDN controller 152 and gateway nodes 102-1 to 102-K, whereas control paths 168, 170 exemplify OF-based messaging paths between SDN controller 152 and switching nodes of the data center implementations 116, 136, respectively, whose messaging functionalities will be further elucidated hereinbelow for purposes of one or more embodiments of the present invention.

Regardless of a particular SDN/virtualization architecture, example data centers 116, 136 may be organized based on a multi-layer hierarchical network model which may generally include three layers of hierarchy: a core layer (typically characterized by a high degree of redundancy and bandwidth capacity, optimized for high availability and performance), an aggregation layer that may be characterized by a high degree of high-bandwidth port density capacity (optimized for traffic distribution and link fan-out capabilities to access layer switches, and an access layer serving to connect host/server nodes to the network infrastructure. In one embodiment, example nodes in an aggregation layer may be configured to serve functionally as a boundary layer between OSI Layers 2 and 3 (i.e., an L2/L3 boundary) while the access layer elements may be configured to serve at L2 level (e.g., LANs or VLANs).

Figure 2:
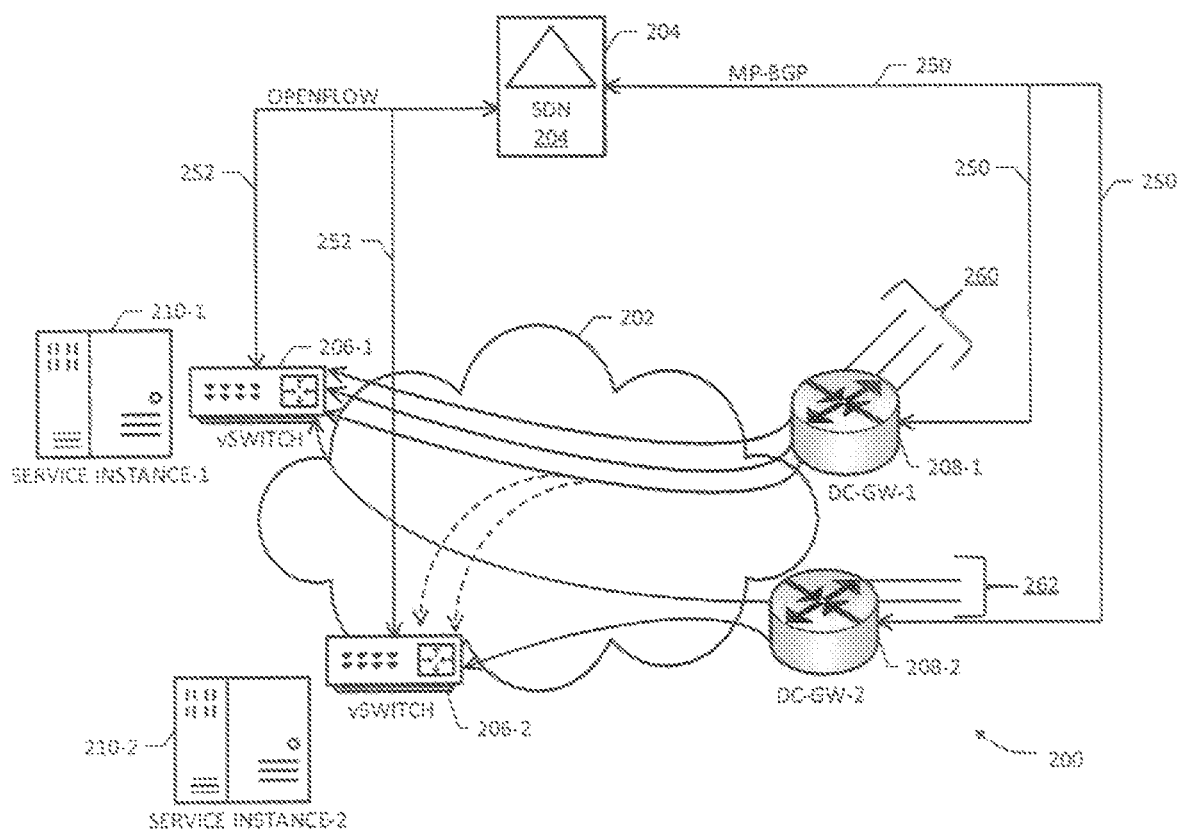
FIG. 2 depicts an example data center with SDN control deployment to an embodiment of the present invention.

To illustrate various embodiments of the present invention, different architectural implementations of an SDN-based data center may be abstracted as a simplified example data center arrangement 200 shown in FIG. 2, wherein a plurality of subscriber/tenant packet flows may be routed from border gateway nodes to one or more switching nodes using routing protocols such as, e.g., ECMP, that support load balancing within the data center's network fabric. Skilled artisans will recognize that the data center 200 is a high level view of the data center portions 116, 136 of the network environment 100 described above in reference to FIG. 1, and accordingly, at least parts of the foregoing description are equally applicable to an example implementation of the data center 200, mutatis mutandis, with a particular focus on SDN deployment as will be set forth in additional detail hereinbelow.

In one implementation, example data center arrangement 200 may be configured for extending tenant L3 networks all the way into virtual switches, e.g., vSwitch nodes 206-1, 206-2, in order to overcome the scalability issue of traditional L2 only tenant networking in data centers. A data center fabric 202 is disposed for interconnecting border gateway nodes, e.g., DC-GW1 208-1 and DC-GW2 208-2 (generally illustrative of a plurality of gateways of the data center) and vSwitch nodes 206-1, 206-2 (generally illustrative of a plurality of switching nodes of the data center) that support various services/applications in multiple instances, as exemplified hereinabove with respect to FIG. 1. Nodes 210-1 and 210-2 hosting/running the service instances are respectively coupled to vSwitch nodes 206-1, 206-2. SDN controller 204 is operative to control vSwitch nodes 206-1, 206-2 using OpenFlow protocol control paths 252 in an example embodiment. Further, SDN controller 204 is configured to interface with gateway nodes 208-1, 208-2 using MP-BGP that can allow different types of address families, e.g., IPv4 and IPv6 addresses as well as unicast and multicast variants thereof. In addition, BGP protocol paths 250 may be advantageously used to advertise bypass routes to gateway nodes for select packet flows with respect to certain embodiments as will be set forth in additional detail below.

Broadly, in one arrangement, vSwitches 206-1, 206-2, may be implemented as part of one or more software application platforms that allow communication between various VMs, e.g., roughly similar to the arrangements exemplified in FIG. 1, although they may be embedded as part of a server's hardware, e.g., as firmware. As a further variation, an Open vSwitch (OVS) implementation may involve providing a distributed virtual multilayer switch platform that facilitates a switching stack while supporting multiple protocols and standards in a virtualization environment. Example management interfaces and protocols operative in an OVS implementation may include but not limited to: NetFlow, sFlow, SPAN, RSPAN, CLI, LACP and 802.1ag, etc.

Whereas the example data center arrangement 200 may include vSwitches 206-1, 206-2 acting as OpenFlow switches, it should be appreciated that such an implementation is not necessary in some embodiments. Skilled artisans will recognize that even a Top of Rack (ToR) switch can be configured as an OpenFlow switch. Typically, in case of a vSwitch-based implementation, tenant/subscriber workloads (e.g., services/applications) would be hosted inside VMs and suitable containers, whereas bare metal servers are connected with ToR switches.

Example data center arrangement 200 may employ protocols such as ECMP with load balancing and gateway redundancy with respect to the incoming traffic so as to improve scalability and reliability of the network. Various subscriber/tenant packet flows, illustrated as packet flow groups 260, 262, entering from one or more external networks (e.g., public networks, private networks, enterprise networks, extranets, intranets, Internet, and/or any combination thereof) via gateway nodes 208-1, 208-2 may therefore be load balanced (e.g., by using hash-based distribution) wherein packets flows may be routed to different switching nodes with a view to balancing the traffic as well as providing failover of a node that may result in withdrawal/unavailability of a route. Similarly, to achieve scale, example data center arrangement 200 may deploy multiple instances of a service, e.g., as illustrated in FIG. 1. Examples of such services could be applications terminating the traffic in the data center (e.g., web applications) or they can be L2/L3 forwarding appliances themselves (e.g., a routing service involving one or more vRouters hosted in a VM). In general, such a service may be hosted on a public IP address, e.g., reachable from the Internet, which may be resolved into one or more internal IP addresses for accessing the service instance(s) depending on how the data center infrastructure is implemented. In operation, SDN controller 204 may be configured to announce multiple equal cost routes for the service instance IP as the prefix with different nodes as next hops to the gateway nodes. Traffic to these service instances are fed by the gateway node receiving the packet flow, which may be configured to make use of ECMP to spray the traffic to the various service instances. Typically, these multiple routes may be learnt by the gateway nodes, e.g., by interfacing with SDN controller 204 using MP-BGP.

For purposes of the present patent application, the terms "flow", "packet flow", or terms of similar import, can be thought of as a stream of packets, wherein substantially all packets belonging to a specific flow may have a set of common properties, states, or characteristics, etc. A property can be a result of applying a function to one or more packet header fields (e.g., destination IP address), transport header fields (e.g., destination port number), or application header fields (e.g., real-time protocol (RTP) header fields; one or more characteristics of the packet (e.g., number of multi-protocol label switching (MPLS) labels); or one or more fields derived from packet treatment (e.g., next hop IP address, output interface). As will be seen below, a packet flow may be identified by a unique n-tuple, e.g., a 5-tuple, comprising, for instance, protocol being used, source Internet Protocol (IP) address, source port, destination IP address, and destination port. A packet may be characterized as belonging to a particular flow if it satisfies substantially all properties of that flow. For example, packets with the same 5-tuple may belong to the same flow. Furthermore, the concept of a packet flow can be defined broadly, e.g., a Transmission Control Protocol (TCP) connection, or all traffic from a particular Media Access Control (MAC) address or Internet Protocol (IP) address, or all packets with the same Virtual LAN (VLAN) tag, or all packets from the same switch port, or all traffic having one or more user-defined control flags, as well as including any combination of the foregoing conditionalities.

Figure 3:
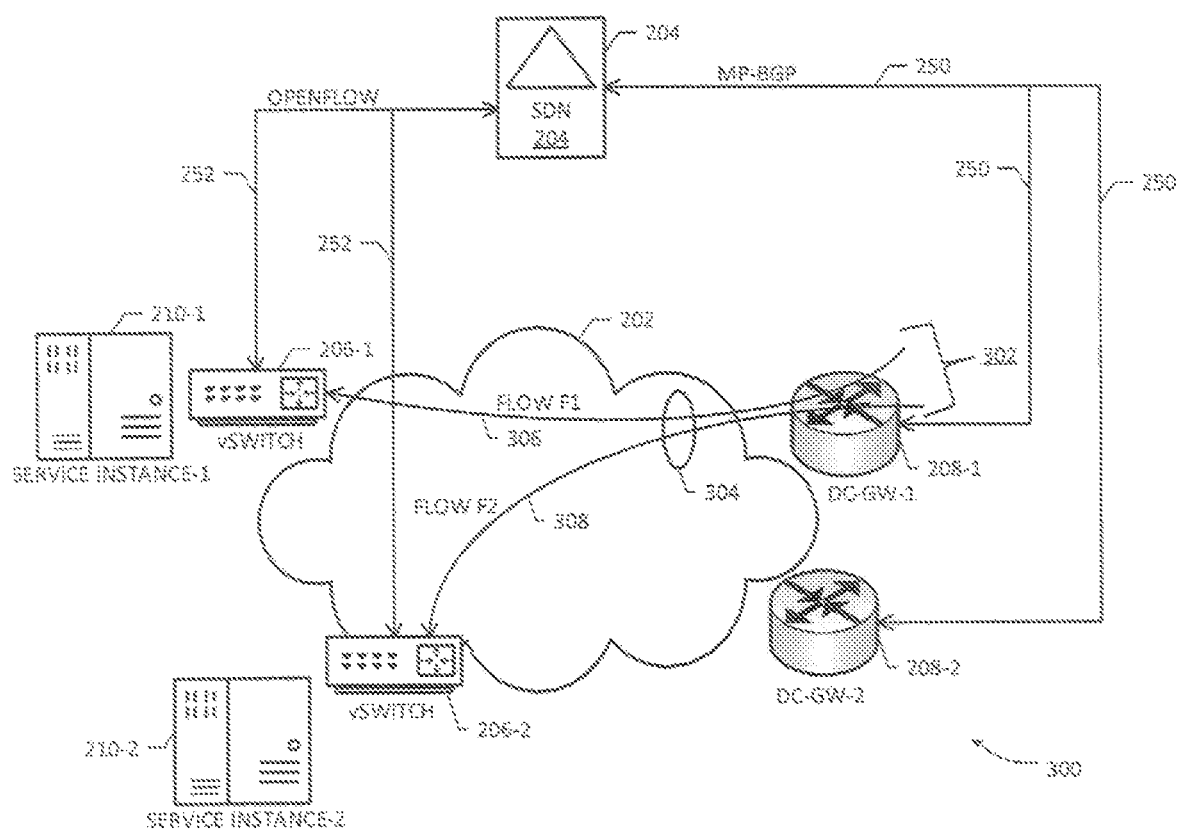
FIG. 3 depicts an example load balancing scenario in the data center of FIG. 2.

Turning to FIG. 3, depicted therein is an example load balancing scenario 300 in connection with data center 200 by way of illustration. Consider a service is hosted on IP {1.1.1.1}, which is located at two VMs, Service Instance-1 and Service Instance-2, exemplified at nodes 210-1, 210-2, respectively. Each of Gateway nodes 208-1, 208-2 is provided with two equal cost routes to the service from SDN Controller 204, one for each service instance. Consider DC-GW1 208-1 receiving traffic on two n-tuple flows, F1 (e.g., DST IP={1.1.1.1}, SRC IP={2.2.2.2}, TCP DST port=80, TCP SRC port=5000) and F2 (DST IP={1.1.1.1}, SRC IP={3.3.3.3}, TCP DST port=80, TCP SRC port=6000) from two end points in the external network toward the service (exemplified as traffic 302). Using DC-GW's own load balancing mechanisms such as 5-tuple hashing (over which SDN controller 204 has no control), flows F1 306 and F2 308 are load balanced and routed via respective ECMP paths 304 such that the packets from Flow F1 306 will be directed to Service Instance-1 210-1 and packets from Flow F2 306 is directed to Service Instance-2 210-2 under normal operation.

Whereas the load balancing as well as gateway redundancy and provisioning of multiple instances of a service can be advantageous, a data center may still encounter failures with respect to certain types of flows for which the foregoing features will not be adequate. For example, the service/application hosted at IP {1.1.1.1} might develop a state with respect to F1 (e.g., subscriber Packet Data Protocol or PDP context which contains the subscriber's session information when the subscriber has an active session). For certain applications, this condition means the packets on F1 should always be sent to {1.1.1.1}, referred to as flow stickiness or flow persistence requirement. In case of ECMP-based routing, it can be seen that certain types of network events can easily disrupt flow stickiness, which can cause service disruption, degradation of quality, etc.

Figure 4:
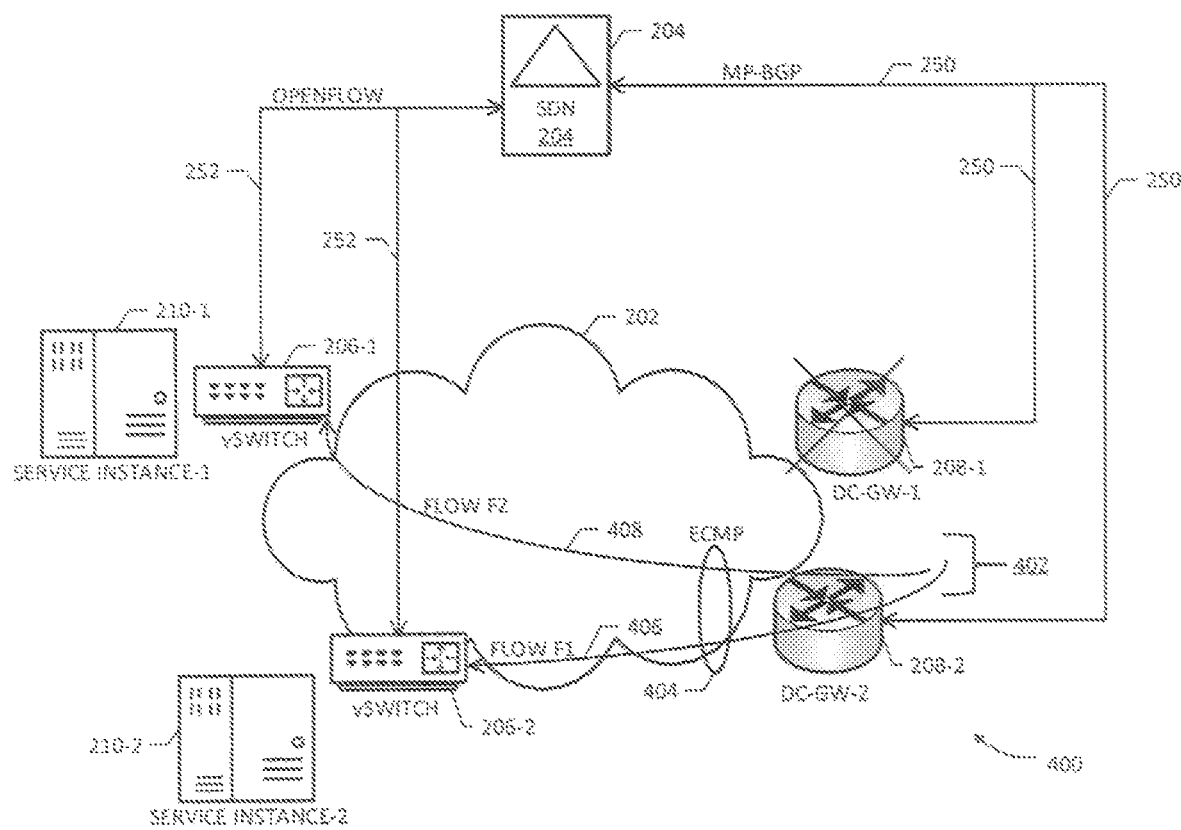
FIGS. 4-6 depict example failure scenarios in the data center of FIG. 2 that may be overcome according to one or more embodiments of the present invention.
Figure 5:
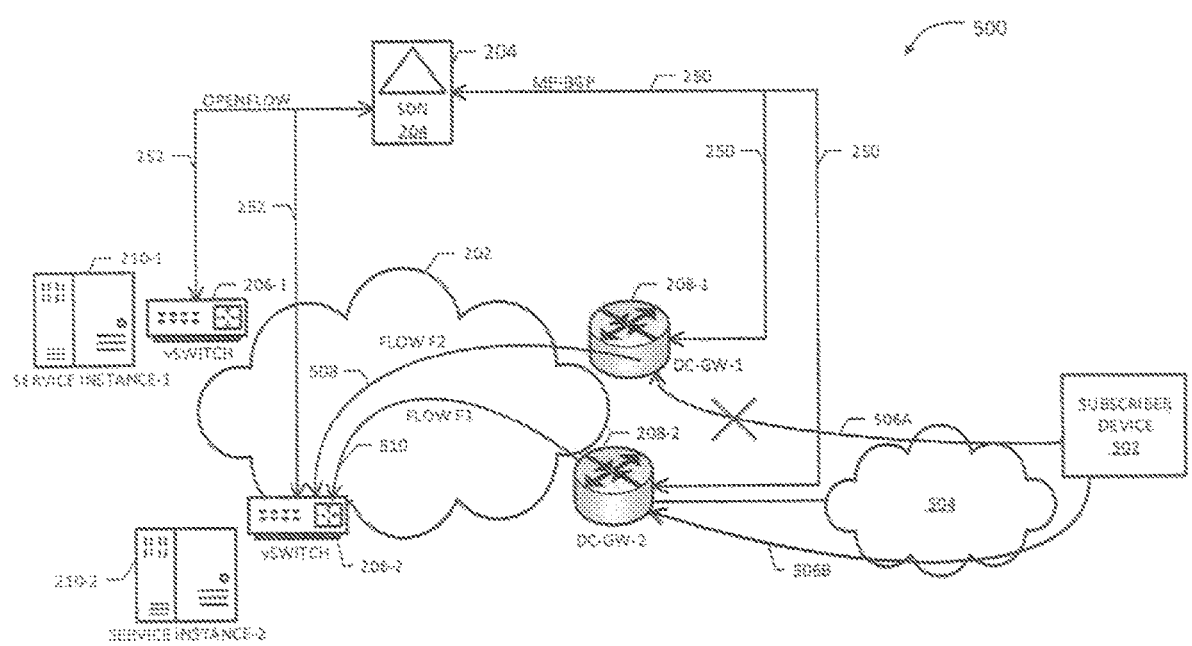
Figure 6:
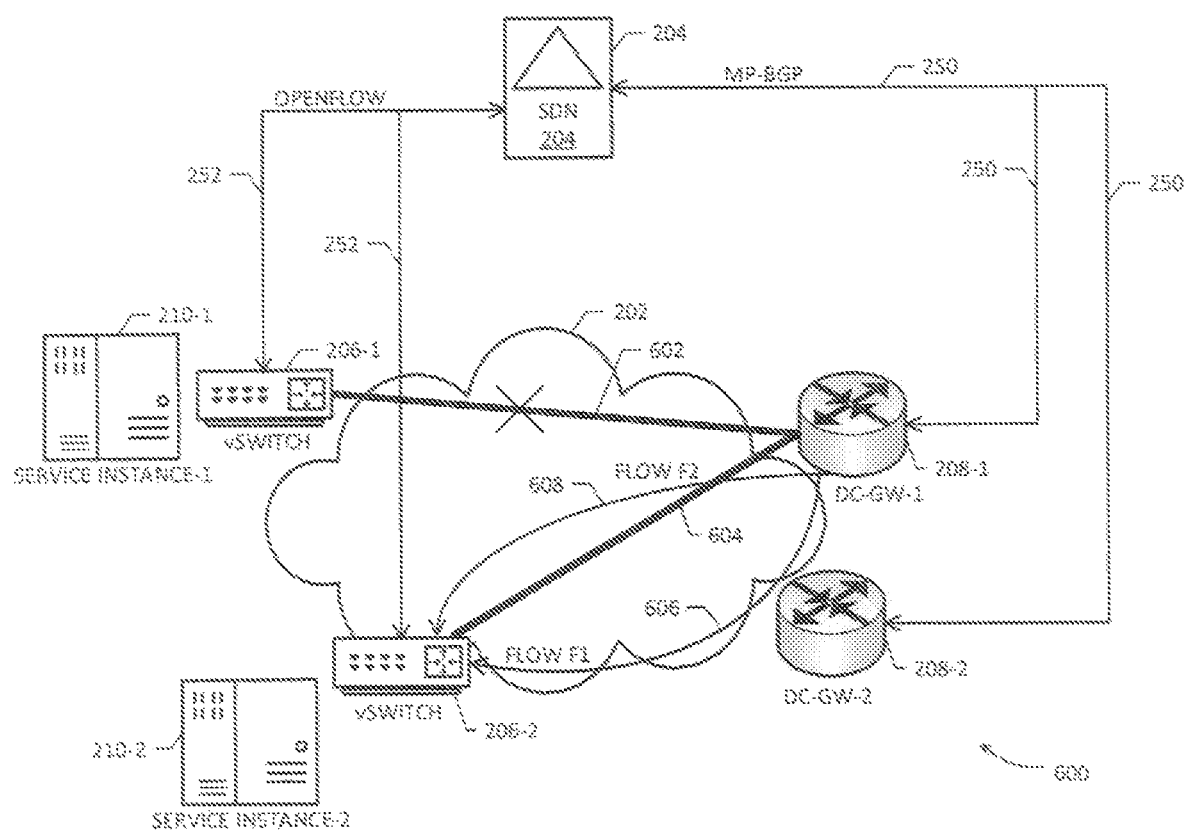

FIGS. 4-6 depict example failure scenarios in the data center arrangement 200 of FIG. 2 that may be overcome according to one or more embodiments of the present invention. In the example scenario 400 of FIG. 4, a flow re-routing event is illustrated that may be caused due to, e.g., a gateway failure. Consider where DC-GW1 208-1 fails for some reason and flows F1 and F2 fail over to DC-GW2 208-2. Whereas this second gateway node, DC-GW2 208-2, also has its equal cost routes to the service, which are the same as the equal cost routes provided to the first gateway node (DC-GW1 208-1), the load balancing mechanisms used by the two nodes can be completely different. Consequently, it is possible that DC-GW2 208-2 directs incoming traffic 402 such that F1 flow 406 is routed to vSwitch 206-2 coupled to Service Instance-2 206-2 (instead of vSwitch 206-1 coupled to Service Instance-1 206-1 as was done by DC-GW1 208-1 prior to failover) while F2 flow 408 is directed to vSwitch 206-1 for Service Instance-1 206-1, as part of ECMP routing 404. Assuming F1 requires flow stickiness, e.g., due to the particular subscriber's service level agreement), re-routing of F1 from vSwitch 206-1 to vSwitch 206-2 can cause undesirable negative effects on the service quality.

In the example scenario 500 shown in FIG. 5, a similar flow re-routing event is illustrated that may be caused due to, e.g., unreachability of a particular gateway because of an external link failure, etc. A subscriber end point host/device 502 is operative to reach DC-GW1 208-1 pursuant to a subscriber session via a network path 506A effectuated in an external network 504. Similar to the example scenario in FIG. 4, this subscriber packet flow is referred to as F1 flow, which is routed to vSwitch 206-1 coupled to Service Instance-1 prior to encountering a link failure in this path. Whereas this flow may now enter the data center via the second gateway node DC-GW2 208-2 (e.g., due to a link failover detection), it may be routed to vSwitch 206-2 coupled to Service Instance-2 pursuant to the load balancing of DC-GW2 208-2, as exemplified as F1 flow 510. It should be noted that other flows entering DC-GW1 208-1 on different links may not be reset to other gateway nodes in this case. Accordingly, F2 flow 508 (e.g., with respect to a different subscriber's session and on a different network link connection) may continue to be routed to vSwitch 206-2 coupled to Service Instance-2 due to the load balancing of DC-GW1 208-1 as before.

Turning to FIG. 6, example scenario 600 depicted therein illustrative of a flow re-routing event is illustrated that may be caused due to, e.g., intra-DC network events. Typically, a DC environment may be implemented wherein ECMP may be coupled with next-hop path monitoring protocols in order to facilitate, e.g., quick traffic redirection when multiple paths are available. For example, the DC-GWs may be configured to employ Bidirectional Forwarding Detection (BFD) to monitor intra-DC path status between the DC-GWs and the vSwitches. In some arrangements, BFD may be employed even to monitor vSwitch⇔vSwitch path monitoring. Although there can be sufficient link redundancy within such a DC environment, path convergence after network failures might take some time. For example, in an L3 DC fabric this convergence time is dictated by the underlay fabric's routing protocol convergence times. Accordingly, in such a scenario, a BFD "DOWN" event can result in subscriber/tenant traffic re-direction. In the example scenario 600, for instance, inter-node communication link 602 between DC-GW1 208-1 and vSwitch node 206-1 may become unavailable (e.g., due to physical, electrical, or software conditions), which may be detected by DC-GW1 208-1 (with a BFD mechanism). Upon detecting that its connectivity with vSwitch connected to Service Instance-1 is broken, DC-GW1 208-1 may be configured to redirect flow F1 606 toward vSwitch 206-2 coupled to Service Instance-2 210-2 via an alternative inter-node link 604. Skilled artisans will recognize that this failure scenario is different from the failure scenarios set forth above as DC-GW2 208-2 is not involved in the redirection of the affected flow (i.e., Flow F1). Further, the routing path for F2 flow 608 from DC-GW1 208-1 to vSwitch node 206-2 remains unaffected because it uses the functioning inter-node link 604.

Since Service Instance-2 210-2 does not have or maintain any state/context associated with F1 flow (and vice versa) in the scenarios above, the corresponding connection may be reset, thereby forcing an end point to restart the connection and begin transmitting traffic again. It should be appreciated that in DC environments having a large number of such sticky flows at any given moment, the impact of flow re-routing in the foregoing scenarios due to failures can be substantial.

Figure 7:
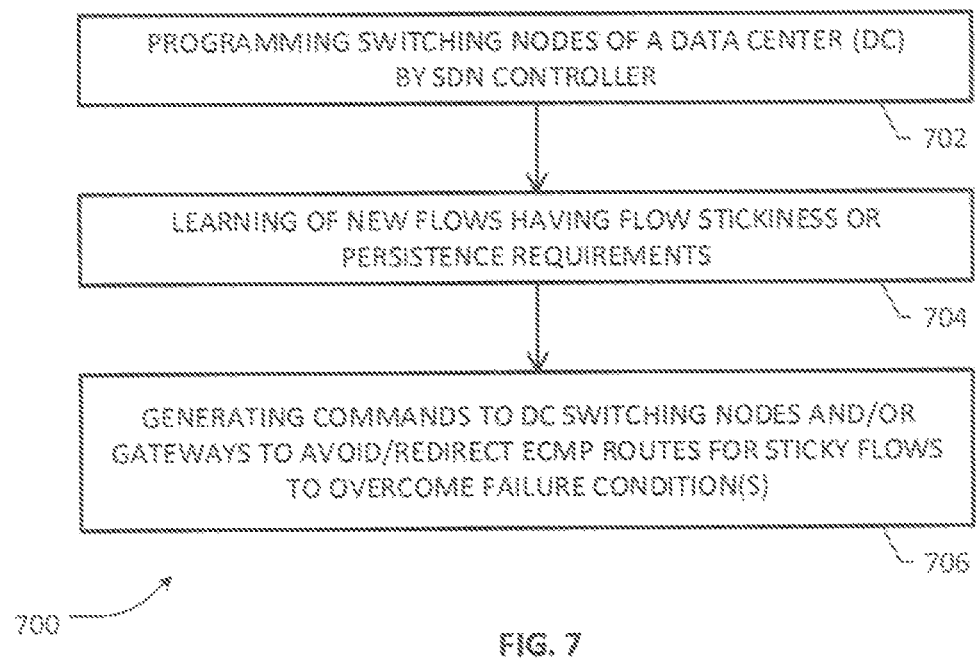
FIG. 7 is a flowchart illustrative of various blocks, steps and/or acts of a method operating at a data center that may be (re)combined in one or more arrangements, with or without blocks, steps and/or acts of additional flowcharts of the present disclosure.

FIG. 7 is a flowchart illustrative of various blocks, steps and/or acts of a method 700 operating at an SDN-based data center (e.g., data center 116, 136, 200) that may be (re)combined in one or more arrangements, with or without blocks, steps and/or acts of additional flowcharts of the present disclosure. At block 702, a plurality of switching nodes of the data center are programmed by an SDN controller associated therewith (e.g., SDN controller 152, 204) in order to facilitate learning of new packet flows into the data center. As will be set forth below, the switching nodes of the data center may be instructed to forward (or, "punt") the very first packet of a new flow (i.e., a packet flow having a new n-tuple identifier set) received by the switching nodes to the SDN controller. In one example implementation, the n-tuple identifier set may comprise a 5-tuple that specifies a source IP address, a source port number, a destination IP address, a destination port number and a protocol in use, although other examples of n-tuples having suitable pieces of identifier data (e.g., 2-tuple, 3-tuple, etc.) may also be used in additional/alternative embodiments. At block 704, the SDN controller may learn, ascertain, determine, identify or otherwise detect that a subscriber session (and by extension, its associated packet flow) has or otherwise requires flow stickiness or persistence. In one embodiment, the SDN controller may receive a subscriber service policy message (e.g., from an OSS/BSS management node, customer policy management node, etc.) that a particular subscriber session requires flow stickiness (e.g., due to a service level agreement). In another arrangement, the SDN controller may perform a statistical analysis of an existing flow and determine that the packet flow requires flow stickiness (e.g., due to the observation that the packets of a particular flow have been routed to a specific switching node associated with a certain service instance over a select time period, thereby establishing or acquiring a subscriber PDP context or state). Regardless of how a packet flow, either new or existing, is determined to acquire or require flow stickiness, the SDN controller may be advantageously configured to generate various commands, instructions, or messages to the switching nodes and/or the gateway nodes to avoid the ECMP routes normally used by the gateway nodes with respect to such sticky flows even when one or more failure conditions such as the example failure scenarios set forth above have been observed in the data center (block 706). In additional/alternative embodiments, the SDN controller may also be advantageously configured to generate various commands, instructions, or messages only to the switching nodes of the data center to redirect the packets of sticky flows received thereat (e.g., due to normal ECMP routing) to one or more other switching nodes that were associated with the sticky flows prior to observing a failure condition in the data center (block 706).

The foregoing embodiments will now be described in further detail below by taking reference to the remaining Figures of the present application, wherein the processes set forth in one or more blocks of FIG. 7 may be further illustrated in conjunction with additional Figures. It will be seen that common to the foregoing embodiments is a programming/learning phase where the SDN controller learns what new flows are coming into the data center and/or if any new flows (or existing flows) require/acquire flow persistence or stickiness characteristics.

One or more embodiments set forth herein advantageously leverage the fact that an SDN controller (e.g., SDN controller 152, 204) operating according to the OpenFlow (OF) specification may be configured to disseminate very granular n-tuple specific information (e.g., 5-tuples as set forth above) into applicable network protocols used with respect to the border nodes (e.g., gateway nodes operative with Multiprotocol Extensions for Border Gateway Protocol (BGP), sometimes also referred to as Multiprotocol BGP or Multicast BGP, MP-BGP for short) in order to control, modify or otherwise influence the gateway nodes' packet routing behavior for select packet flows. Although the SDN controller cannot influence a load balancing algorithm executing in the DC-GW nodes, it can be configured to learn the n-tuple flows that are directed towards the switching nodes by a DC-GW. To accomplish this, a switching node of the data center (e.g., an OF switch such as vSwitch1 206-1 in FIG. 2) may be programmed in an embodiment of the present invention by the SDN controller to forward punt only the very first packet on a new 5-tuple arriving from a DC-GW to the controller, as previously set forth. Taking reference to FIGS. 8A-8C, flowcharts set forth therein are illustrative of various blocks, steps and/or acts that may be (re)combined in one or more arrangements, with or without blocks, steps and/or acts of additional flowcharts of the present disclosure. Process 800A of FIG. 8A sets forth an embodiment wherein gateway nodes of a data center are provided with suitable alternative routing paths advertised by an SDN controller with respect to sticky flows identified by respective n-tuples. At block 802, the SDN controller generates appropriate instructions (e.g., OF-compliant instructions) to a plurality of switching nodes of the data center to forward first packets of new flows coming from various gateway nodes pursuant to various subscriber sessions involving one or more external networks. Responsive thereto, a first packet of a packet flow is received from a first switching node coupled to a service instance of a service hosted by the data center, wherein the first packet is identified by an n-tuple flow specification, the packet flow flowing from a DC gateway connected to the external network (block 804). At block 806, a determination is made that the packet flow requires or has acquired flow stickiness characteristics. As set forth previously in reference to FIG. 7, a variety of mechanisms involving operator policies, service provider policies subscriber-specific policies, etc. as well as statistical analysis of network flows within the data center may be used in respect of such determinations. Responsive to the determination that a packet flow requires or has acquired flow stickiness characteristics, bypass or alternate routing paths may be computed by the SDN controller with respect to the packet flow, wherein the bypass routing paths have a switching node destination identified as the first switching node and are associated with the n-tuple specification of the packet flow. Further, the bypass routing paths are advertised by the SDN controller to each of the DC gateways via a suitable BGP-based mechanism, as set forth at block 808. In one example implementation, the SDN controller uses BGP Flow Specification (flowspec) (BGP-FS) to provide the DC gateway nodes with the alternate routing path information regarding the packet flow (e.g., including the first switching node as the destination, the n-tuple flow specification, as well as next hop information, and the like). BGP Flow Specification, set forth as RFC 5575, incorporated by reference herein (see https://tools.ietf.org/html/rfc5575), may be implemented in accordance with the teachings herein to specify packet fields as prefixes (e.g., equivalent to Access Control Lists or ACLs), as opposed to traditional MP-BGP which uses matches of only destination IPs in the packet. As will be seen in further detail below, this alternate routing path information may be utilized by the DC gateway nodes by implementing a suitable packet pipeline mechanism for avoiding conventional ECMP routing (i.e., bypassing ECMP hits) with respect to any sticky packet flows arriving from external networks.

In an additional or optional variation, a determination may be made whether the sticky packet flow session has terminated, timed out, or otherwise inactivated (block 810). Responsive thereto, the SDN controller may provide suitable instructions, commands, or control messages to the DC gateways to inactivate and/or delete the bypass routing paths advertised via BGP-FS (block 812).

Figure 8A:
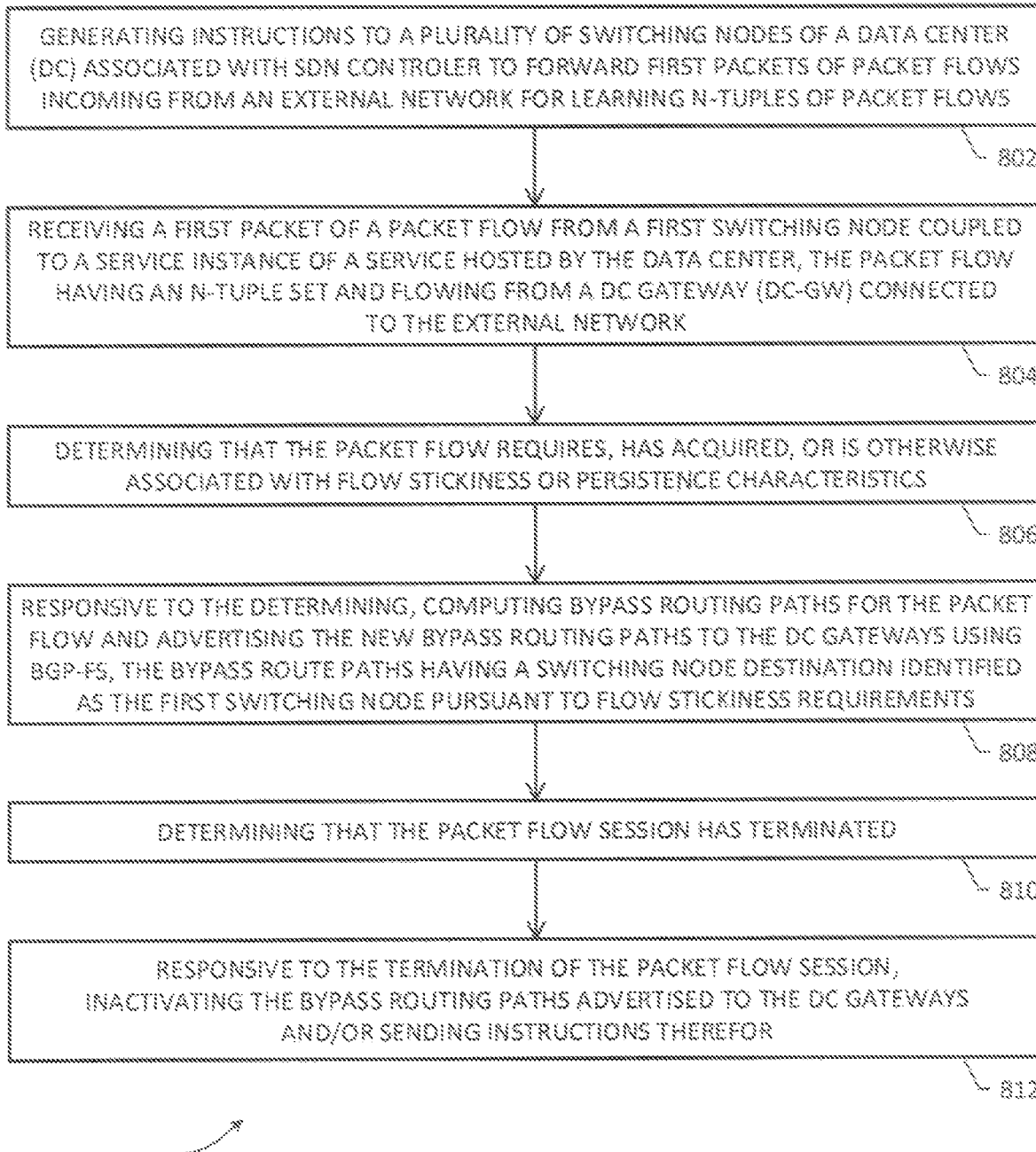
FIGS. 8A-8C are flowcharts illustrative of various blocks, steps and/or acts that may be (re)combined in one or more arrangements, with or without blocks, steps and/or acts of additional flowcharts of the present disclosure.
Figure 8B:
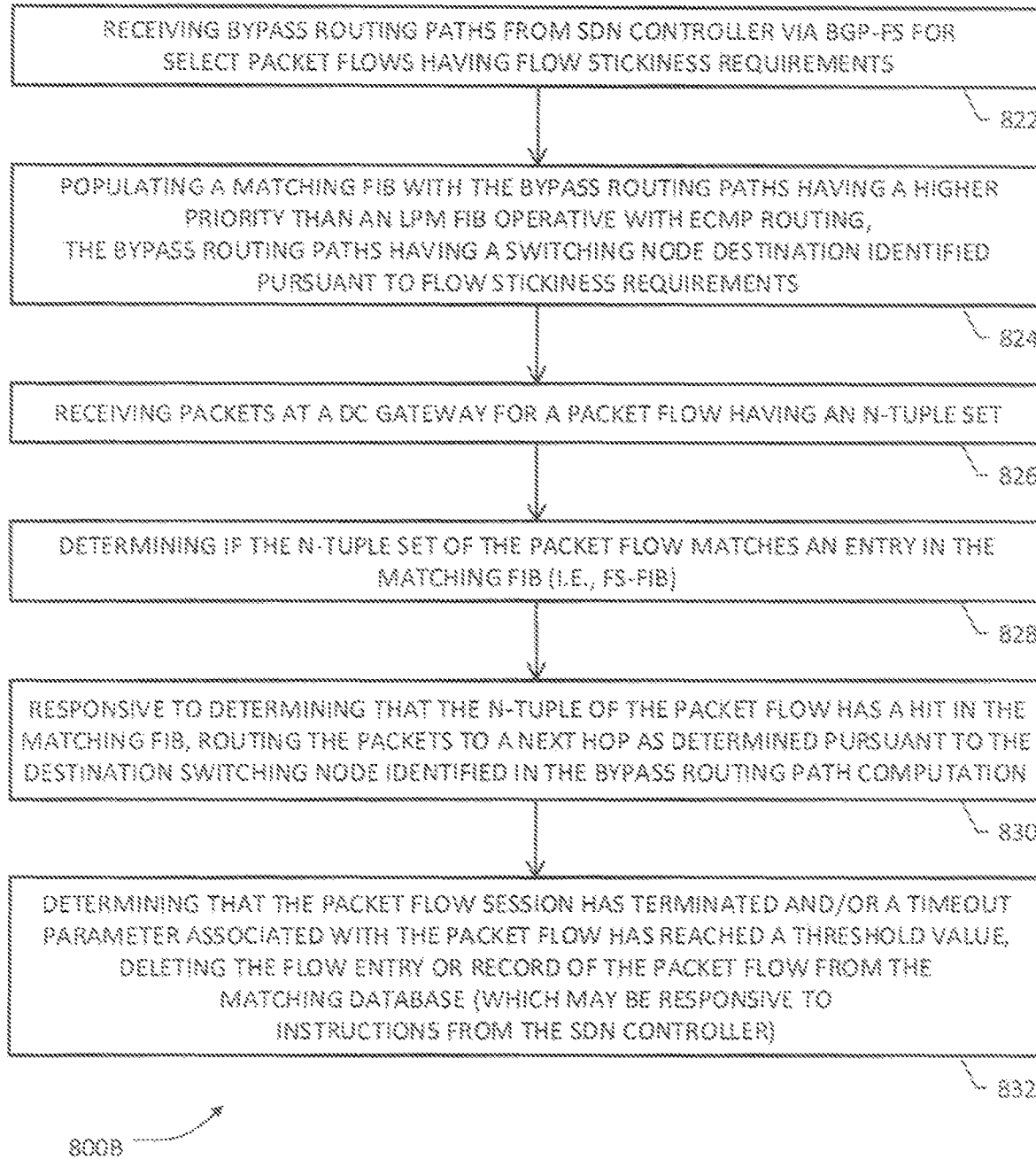

Process 800B shown in FIG. 8B illustrates an embodiment of a packet processing method at a DC gateway node (e.g., DC-GW 208-1, 208-2). At block 822, the DC gateway nodes receive bypass routing paths from an SDN controller (e.g., SDN controller 152, 204) via BGP-FS for select packet flows having flow stickiness requirements and/or characteristics. At block 824, a suitable routing data structure, referred to herein as a matching n-tuple Forward Information Base (FIB) or FlowSpec FIB (FS FIB), is populated with the bypass routing paths including select n-tuple flow identifier sets and specific switching node destinations corresponding thereto. In accordance with the teachings of the present invention, the matching FIB is disposed in a gateway packet pipeline (set forth in additional detail hereinbelow) in relation to a Longest Prefix Match (LPM) Forwarding Base (FIB) used for determining ECMP routing paths to one or more switching nodes of the data center. Further, in an example embodiment, the bypass routing paths provided via BGS-FS are accorded a higher priority than ECMP-based routing paths. When packets of a particular packet flow arrive at the DC gateway pursuant to a subscriber session via an external network, the particular packet flow having a particular n-tuple identifier set, a determination may be made if the particular n-tuple identifier set of the particular packet flow matches an entry in the matching FIB, as set forth at blocks 826 and 828. If so, responsive to the determining that the n-tuple of the packet flow has a hit in the matching FIB, the packets of the particular packet flow may be forwarded to a corresponding switching node identified in the bypass routing path associated with the particular n-tuple identifier set instead of routing the particular packet flow according to an ECMP path computation (block 830). In a further variation, a determination may be made and/or an instruction may be obtained from the SDN controller that the particular packet flow session has been terminated, timed out or otherwise inactivated. Responsive thereto, the DC gateway node may be configured to delete the n-tuple flow entry or record of that packet flow from the matching FIB, as set forth at block 832.

Figure 8C:
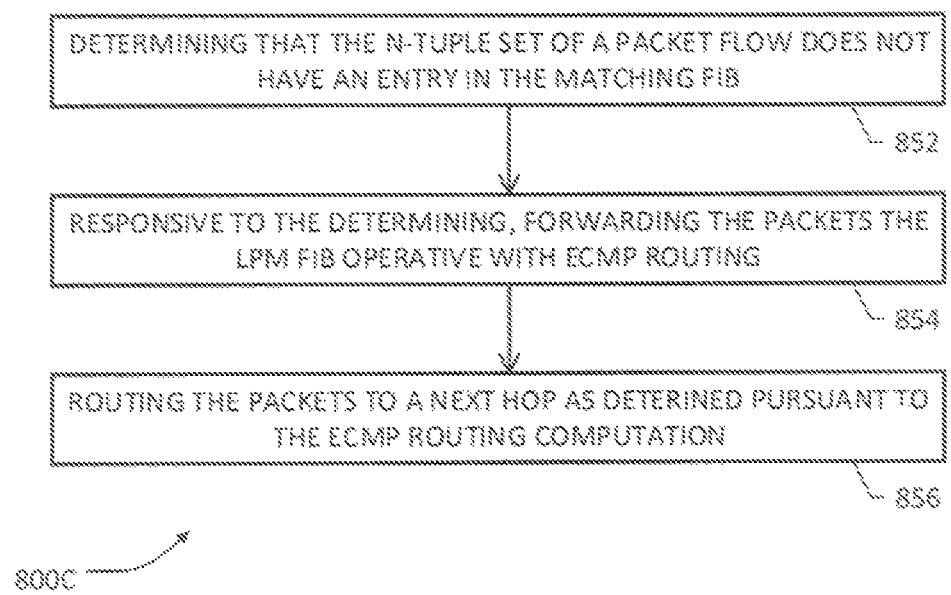

Process 800C depicted in FIG. 8C, which may be augmented within some of the example processes set forth above in additional/alternative embodiments, is illustrative of a scenario when a packet flow received at a DC gateway node does not match the records in a DC gateway's n-tuple FS FIB. At block 852, a determination is made that the n-tuple set of the packet flow does not have an entry (i.e., no hit) in the matching FS-FIB. Responsive thereto, the packets are forwarded to an LPM FIB structure provided as part of the gateway's packet pipeline, as set forth at block 854. As ECMP is used in computing paths with respect to the LPM FIB (e.g., employing a hash-based distribution for load balancing), the packet flow not having a hit in the matching FIB may be routed to a next hop toward any switching node as per the ECMP path computation (block 856). In one arrangement, a hash-based load balancing may involve hashing on any portion of an n-tuple flow specification set, e.g., source IP address, source port, destination IP address, destination port, and protocol type, to map traffic to available servers/switches. As such, there is no requirement of a "stateful ECMP" on the IP addresses for traffic processed via LPM FIB forwarding path in an example embodiment of the present invention.

Figure 9:
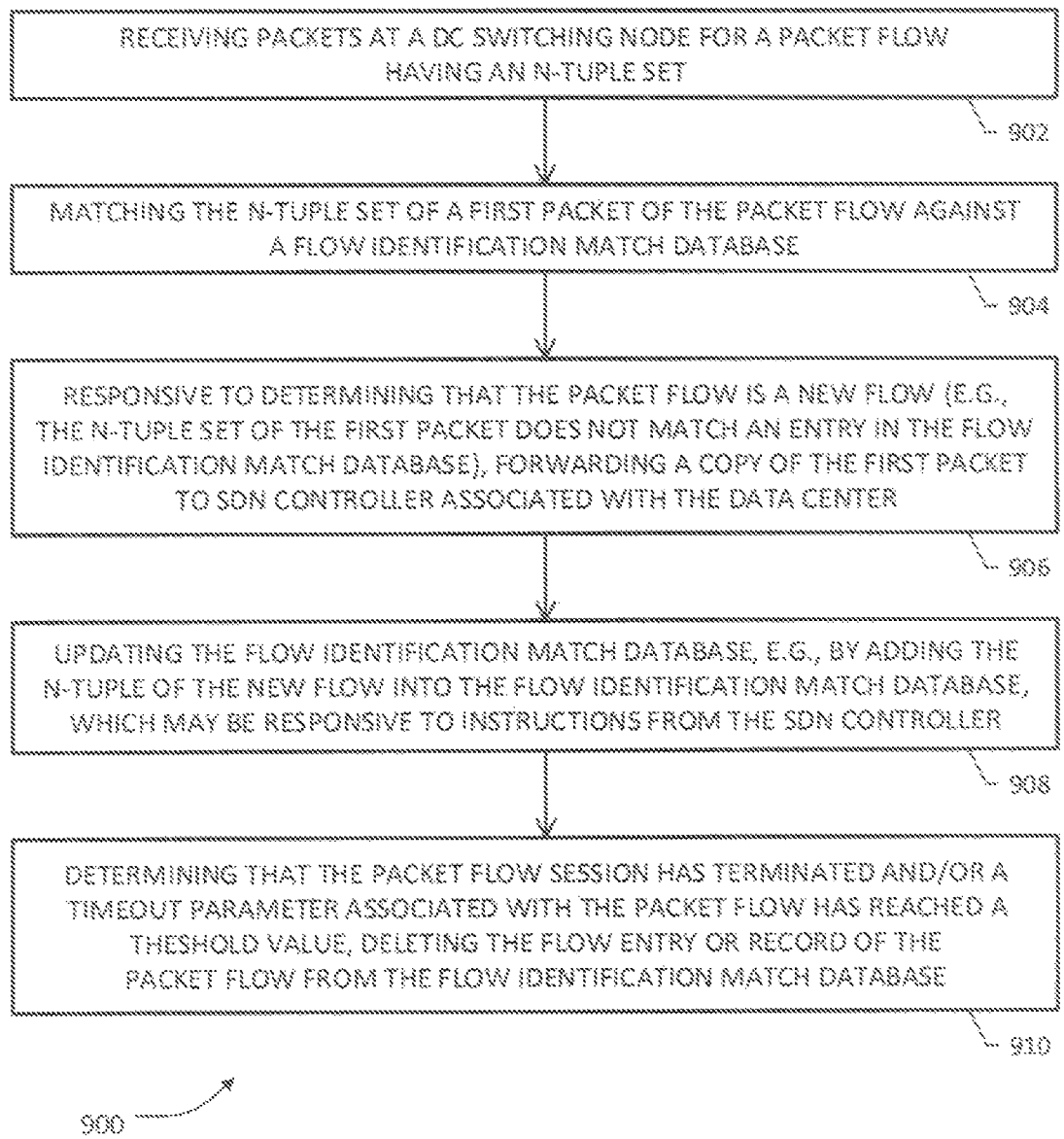
FIG. 9 is flowchart illustrative of various blocks, steps and/or acts that may be (re)combined in one or more arrangements, with or without blocks, steps and/or acts of additional flowcharts of the present disclosure.

FIG. 9 is flowchart illustrative of a process 900 for facilitating learning of new flows in a data center according to an embodiment of the present invention. As noted elsewhere in the patent application, various blocks, steps and/or acts of process 900 may be (re)combined and/or replaced in one or more arrangements, with or without blocks, steps and/or acts of additional flowcharts set forth herein. At block 902, a switching node receives packets from one or more gateway nodes with respect to one or more packet flows, each having corresponding n-tuple sets. When a packet of a packet flow arrives, the corresponding n-tuple is matched against a flow identification match database (block 904). If it is determined that the packet is a new flow, i.e., the n-tuple does not have a hit in the flow identification match database, the packet is a first packet and a copy of that packet is forwarded to the SDN controller of the data center, as set forth at block 906. Further, the flow identification match database is updated or otherwise populated by adding the n-tuple of the new flow (block 908). In one arrangement, such updating and/or populating a flow identification match database at a switching node may be effectuated responsive to OF-based instructions from the SDN controller as described elsewhere in the present patent application. Suitable mechanisms may also be provided for non-OF switching nodes for creating and populating appropriate databases, tables or data structures in order to facilitate identification of new flows to a data center controller in additional or alternative embodiments of the present invention. In a further variation, a determination may be made and/or an instruction may be obtained from the SDN controller that a packet flow session has been terminated, timed out or otherwise inactivated. Responsive thereto, the DC switching node may be configured to delete the n-tuple flow entry or record of that packet flow from the flow identification match database, as set forth at block 910. Skilled artisans will further appreciate that at least a portion of the foregoing acts or blocks may be implemented as programming and learning phases set forth above in reference to FIGS. 7 and 8A.

Figure 10A:
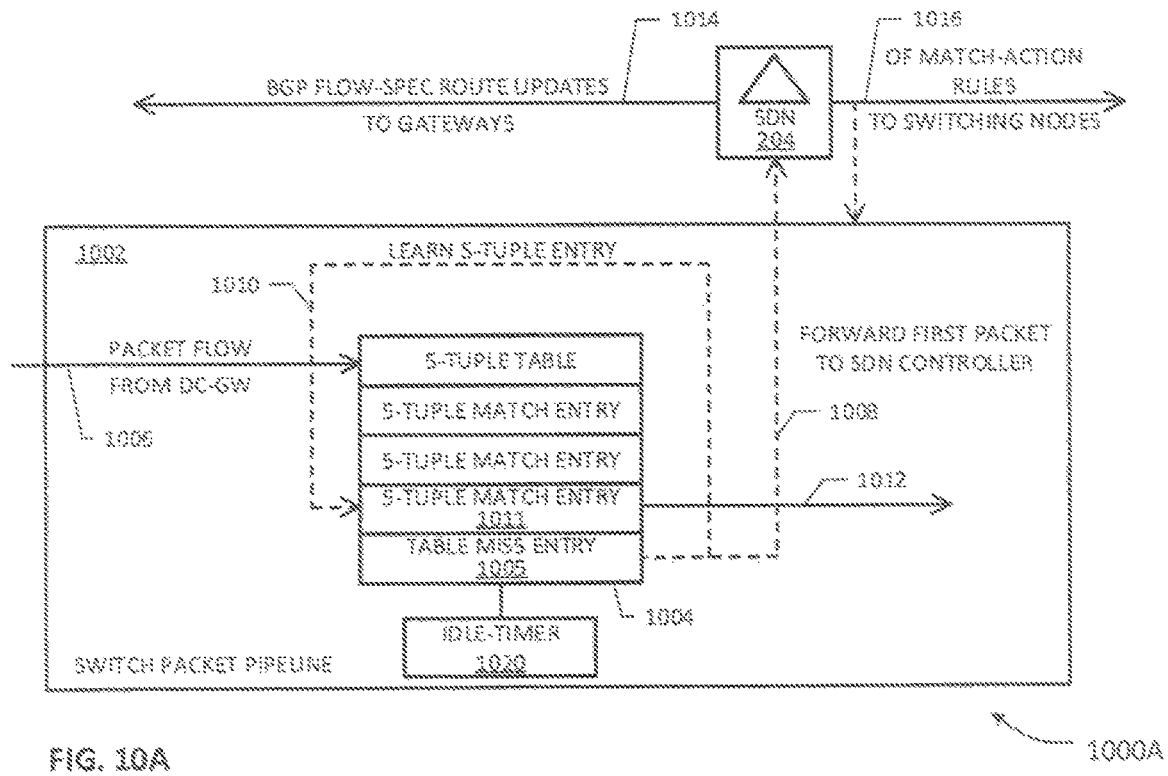
FIGS. 10A and 10B depict example pipeline structures and associated components of a switching node and a gateway node, respectively, according to an embodiment of the present invention.
Figure 10B:
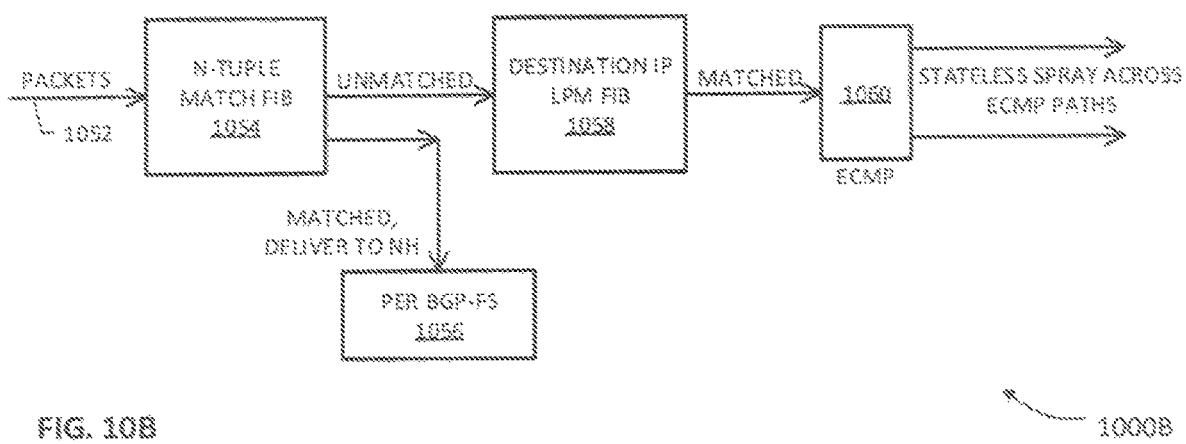

FIGS. 10A and 10B depict example pipeline structures and associated components of a switching node and a gateway node, respectively, according to an embodiment of the present invention. Reference numeral 1000A in FIG. 10A generally refers to a portion of a data center environment (such as, e.g., data center 200 in FIG. 2) that exemplifies a switching node packet pipeline 1002, which includes an n-tuple flow identification database, table or other suitable data structure 1004 that may be programmed and/or populated for purposes of learning new flows in the data center. Packets arriving from the DC gateway nodes for various packet flows, e.g. packet flow 1006, may be run through the n-tuple flow identification database 1004 for interrogation. In one example implementation, the n-tuple may comprise a 5-tuple flow specification that includes a source IP address (src-IP), a destination IP address (dst-IP), protocol, source port address (src-port), and destination port address (dst-port), although a combination/subcombination thereof as well as other indicia may be used additional/alternative arrangements, as previously noted. Any table miss entry 1005 indicates that it is a new packet flow with a corresponding new n-tuple, and a copy of that packet may be punted to SDN controller 204 via path 1008. In one example embodiment, depending on determining that the packet flow requires flow stickiness, SDN controller 204 may be configured to instruct the switching node to add the new 5/n-tuple back into the flow identification database 1004, as indicated by programming path 1010. Skilled artisans will recognize that by adding the n-tuple back into the flow identification database 1004, a switching node may be prevented from further punting of packets from the switching node to the controller. However, in some embodiments there can still be a flurry of packet punts to SDN controller 204. Accordingly, in an additional or alternative implementation, such a situation may be avoided by configuring the switching node to add an n-tuple entry into the flow identification database 1004 on its own (e.g., without having to receive instructions from SDN controller 204), preferably with a timing threshold value, such as an IDLE_TIMER value, aging timer, etc., which may be individually configured for different packet flows. Although a single IDLE_TIMER block 1020 associated with the flow identification database 1004 is shown in FIG. 10A, it will be apparent that each table entry or record may include a corresponding timer value in some embodiments. Furthermore, similar timing mechanisms may also be provided to age out stale n-tuple entries corresponding to completed sessions.

If there is a match found in the flow identification database 1004, e.g., as exemplified by match entry record 1011, the packet may proceed to further processing, e.g., delivered to the service instance, as exemplified by path 1012.

Responsive to determining that a new flow or an existing flow requires or has acquired flow stickiness, SDN controller 204 is operative in one embodiment to provide alternate bypass routes or updates 1014 using BGP-FS to one or more gateway nodes in order to facilitate avoidance of conventional ECMP-based routing paths as set forth hereinabove. In one arrangement, once the controller identifies the n-tuple flow as being a sticky flow, it advertises the n-tuple with the Next-Hop (NH) configured to the switching node having the state/session stickiness with respect to that flow. The route advertised via BGP-FS for the flow to the gateways is identical such that any gateway receiving that packet flow will use the route to forward the packets to the specific switching node. In another arrangement, SDN controller 204 may be configured to provide suitable match-action rules 1016 to the DC switching nodes that identify specific switching node destinations for the sticky flows in order to facilitate redirection of such sticky flows to the appropriate switching nodes as will be described in additional detail further below. It should be appreciated that these two embodiments may be practiced independently or jointly in some arrangements.

In an implementation involving OVS architecture, an embodiment of the present invention may be configured to employ OpenFlow Nicira extensions, see http://docs.openvswitch.org/en/latest/tutorials/ovs-advanced/, incorporated by reference herein, for facilitating the addition of a flow entry into the flow identification database 1004, e.g., with respect to a new flow. By way of illustration, a NXAST_LEARN action may be provided as a new action for facilitating flow entries into a database in an OVS implementation. In a non-OVS implementation, an embodiment of the present invention may be configured to provide an OF switch operative to support an equivalent OF extension.

Since a DC switching node of the present invention may be configured to add an n-tuple match entry for a packet flow into the flow identification database 1004 just prior to punting the first packet to SDN controller 204, the subsequent packets of the flow are not punted to the controller as they would not miss the entry match (i.e., a hit is found on the subsequent packets). In one arrangement, SDN controller 204 may be configured to maintain a cache of ongoing flows in the data center network. Upon receiving a punted packet, SDN controller is operative to extract the n-tuple information from the packet, update the cache, and provide applicable BGS-FS routing updates and/or match-actions rules to the various DC nodes.

Turning to FIG. 10B, depicted therein is an example packet pipeline structure 1000B of a DC gateway node for purposes of an embodiment of the present invention. An n-tuple match Forward Information Base (FIB) 1054 may be provided as part of the packet pipeline structure 1000B, which may be populated and/or otherwise programmed with the bypass path routing information for select packet flows (e.g., packet flows determined to be sticky) advertised via BGP-FS by the SDN controller. As noted elsewhere, the bypass routing path information may be comprised of, e.g., n-tuple, destination switching node, next hop reachability, etc. In one arrangement, the n-tuple match FIB 1054 may be installed in the packet pipeline 1000B with a higher priority than conventional ECMP routing mechanism(s) that may be already present in the gateway node, which may utilize an Longest Prefix Match (LPM) Forwarding Base (FIB) 1058 for packet routing. When packets of a packet flow 1052 arrive at the gateway node, the n-tuple of the packet flow is interrogated against the n-tuple matching FIB 1054. If there is a hit, a corresponding BGP-FS bypass routing path is used for forwarding the packets to a Next-Hop toward the particular switching node as destination, exemplified in block 1056. If there a miss in the matching FIB 1054, the packets are subjected to the conventional ECMP-based routing, e.g., by utilizing LPM FIB 1058 in conjunction with an ECMP load balancing module 1060 for routing the packets across one or more available switching nodes (i.e., stateless spraying).

Because the BGP-FS based routing paths are identical in all DC gateway nodes, failure of one node will not impact the forwarding behavior for the sticky flows. Accordingly, ongoing sticky flows will continue to be forwarded to the same service instance regardless of the gateway(s) forwarding the packets for other flows using conventional ECMP mechanisms. One skilled in the art will appreciate that this bypass forwarding behavior advantageously ensures that the sticky sessions will not be terminated in a data center of the present invention if certain failure modes such as one or more of the failure scenarios exemplified above in reference to FIGS. 4-6 are encountered.

Skilled artisans will further recognize that the foregoing gateway node packet pipeline structure 1000B is illustrative rather than limiting and a number of variations may be implemented in accordance with the teachings herein as long as a logical pipeline may be effectuated with the bypass routes having a higher priority than any conventional ECMP based routing mechanisms. Example embodiments may be configured such that implementing BGS-FS does not alter ECMP behavior of the border routers such as gateway nodes.

In a typical embodiment, ECMP routing mechanisms may continue to be stateless even with BGP-FS routes, whereas BGP-FS route based matches are handled in separate tables as ACL matches. Further, routing databases associated with example gateway nodes' respective packet pipelines may be provided as part of a virtual routing and forwarding (VRF) arrangement that can allow different routing FIB s as separate routing instances.

Figure 11A:
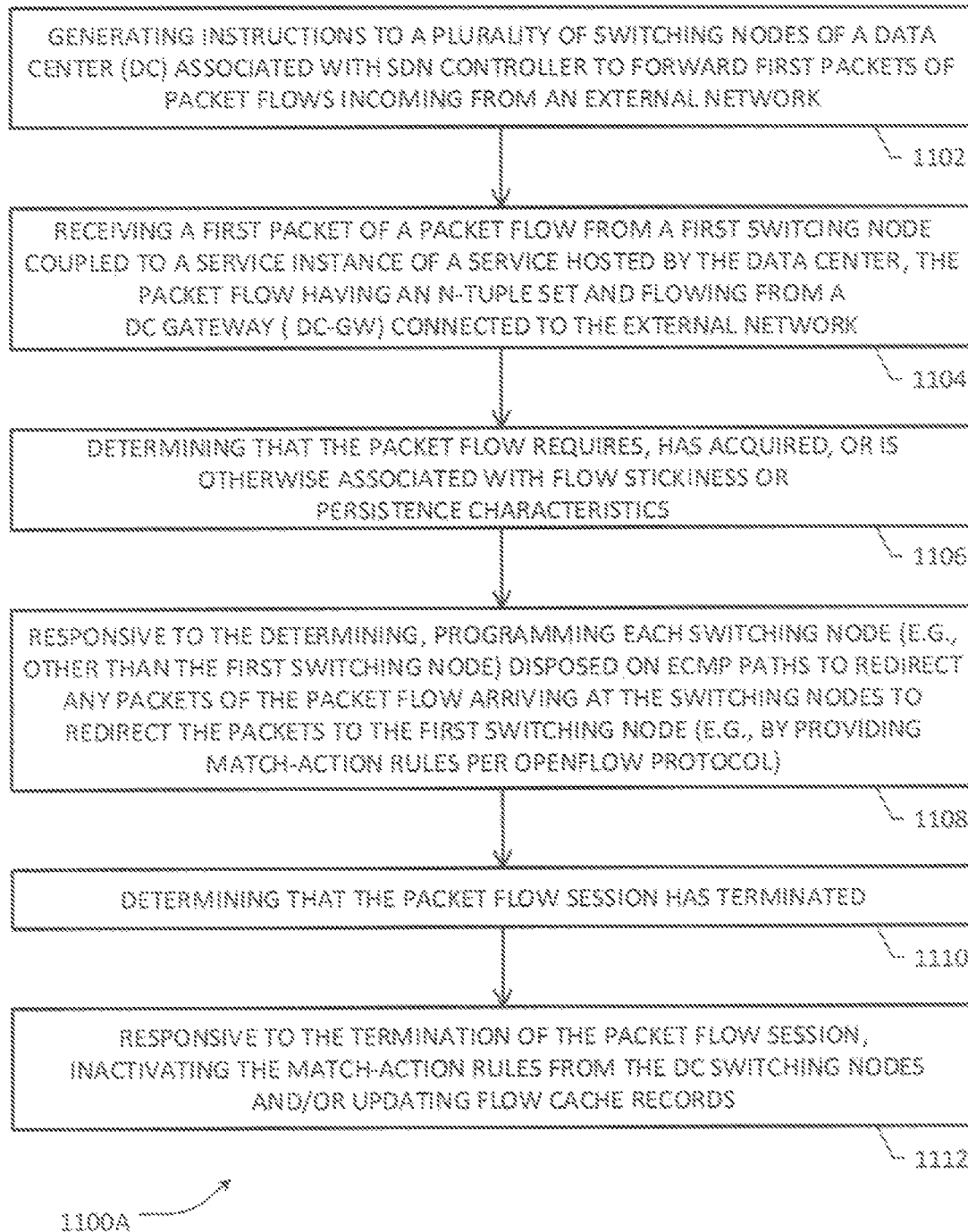
FIGS. 11A and 11B are flowcharts illustrative of various blocks, steps and/or acts that may be (re)combined in one or more arrangements, with or without blocks, steps and/or acts of additional flowcharts of the present disclosure.
Figure 11B:
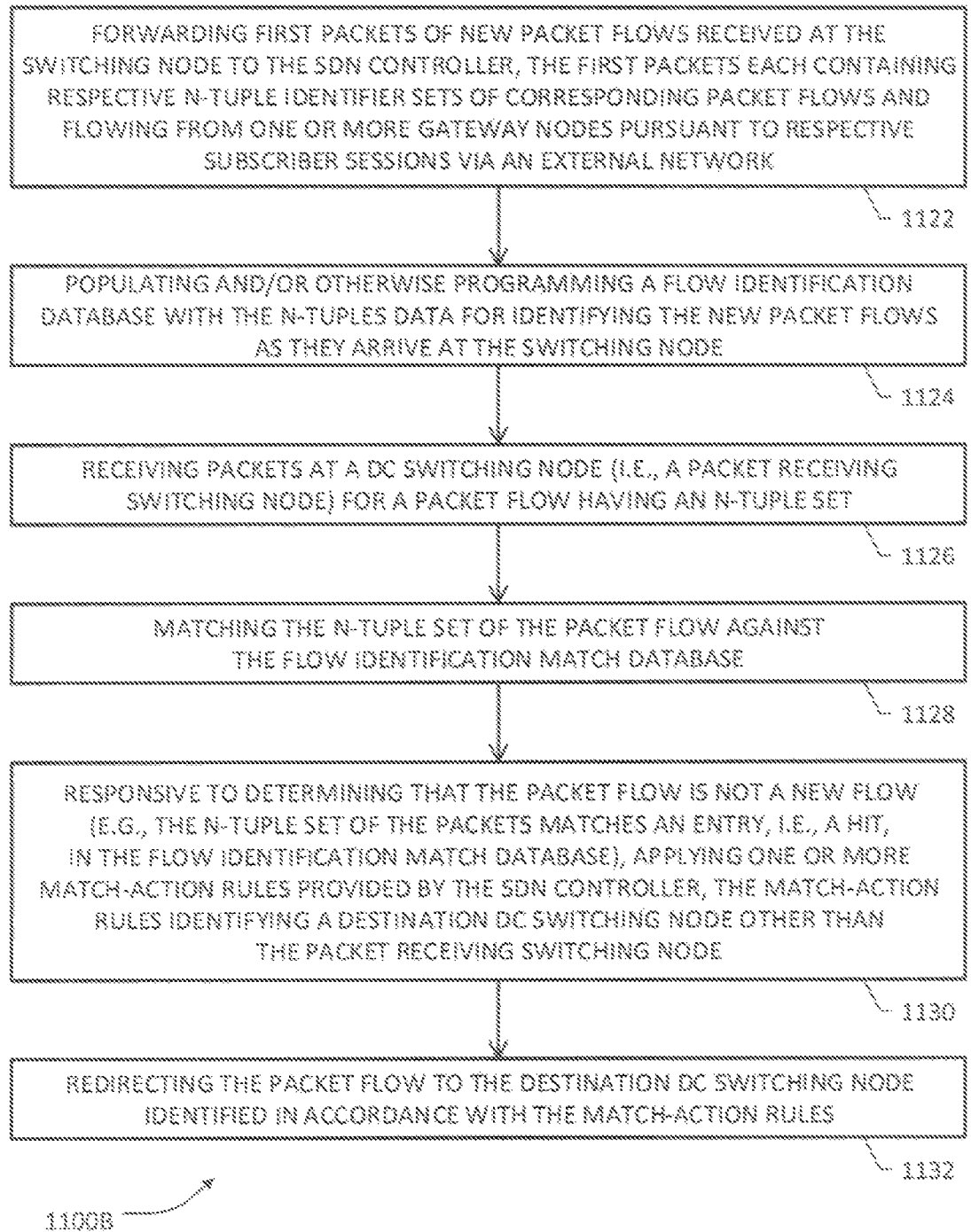

FIGS. 11A and 11B are flowcharts illustrative of various blocks, steps and/or acts that may be (re)combined or replaced in one or more arrangements, with or without blocks, steps and/or acts of additional flowcharts of the present disclosure with respect to embodiments relating to redirection of sticky packet flows by switching nodes of a data center. Process 1100A set forth in FIG. 11A is illustrative of a set of steps, blocks and/or acts that may take place at an SDN controller of the data center, at least some of which pertain to a learning/programming phase of the SDN controller similar to the embodiments set forth hereinabove. Accordingly, skilled artisans will recognize that the acts set forth at blocks 1102, 1104, 1106 are substantially identical to the acts set forth at blocks 802, 804, 806 of FIG. 8A, whose description is equally applicable here, mutatis mutandis. At block 1108, responsive to the determination that a packet flow requires or has acquired flow stickiness characteristics, the SDN controller is operative to generate programming instructions to each switching node (preferably other than the switching node punting the first packet, which may be referred to as a first switching node) of the data center disposed on ECMP paths to redirect any packets of the packet flow arriving at the switching nodes to redirect the packets to the first switching node. In one example embodiment, suitable OF-based match-action rules with respect to the sticky flows may be provided to the switching nodes, as noted elsewhere in the present patent application. Upon determining that the packet flow session for a sticky flow has been terminated, further instructions may be provided to the switching nodes to delete, inactivate or otherwise disable the match-action rules, as set forth at blocks 1110 and 1112.

Process 1100B of FIG. 11B is illustrative of various steps, acts and/or blocks operating at a switching node, which may be augmented with other steps, acts and/or blocks set forth above in certain embodiments. At block 1122, a switching node forwards first packets of new packet flows received at the switching node to the SDN controller, the first packets each containing respective n-tuple identifier sets of corresponding packet flows and flowing from one or more gateway nodes pursuant to respective subscriber sessions via an external network. At block 1124, a flow identification database may be populated and/or otherwise programmed with the n-tuples data for identifying the new packet flows as they arrive at the switching node. As noted previously, one or more of the foregoing acts may be performed by a switching node responsive to receiving instructions from the SDN controller or may be performed on its own pursuant to the switching node's configuration. At block 1126, packets are received at a switching node (i.e., a packet receiving switching node or a first switching node) for a particular packet flow having an n-tuple set, which may be interrogated against the flow identification database for a match (block 1128). Responsive to determining that the packet flow is not a new flow (e.g., the n-tuple set of the packets matches an entry, i.e., a hit, in the flow identification match database), one or more match-action rules provided by the SDN controller may be applied against the packet flow, wherein the match-action rules are operative to identify a destination DC switching node other than the packet receiving switching node (block 1130). The packet receiving switching node may then redirect the packet flow to the destination DC switching node identified in accordance with the match-action rules (block 1132). In a further variation, a determination may be made and/or an instruction may be obtained from the SDN controller that a packet flow session has been terminated, timed out or otherwise inactivated. Responsive thereto, the DC switching node may be configured to delete the n-tuple flow entry or record of that packet flow from the flow identification match database, as set forth at block 910 of FIG. 9, which may be augmented within the flowcharts of FIGS. 11A and 11B.

Figure 12:
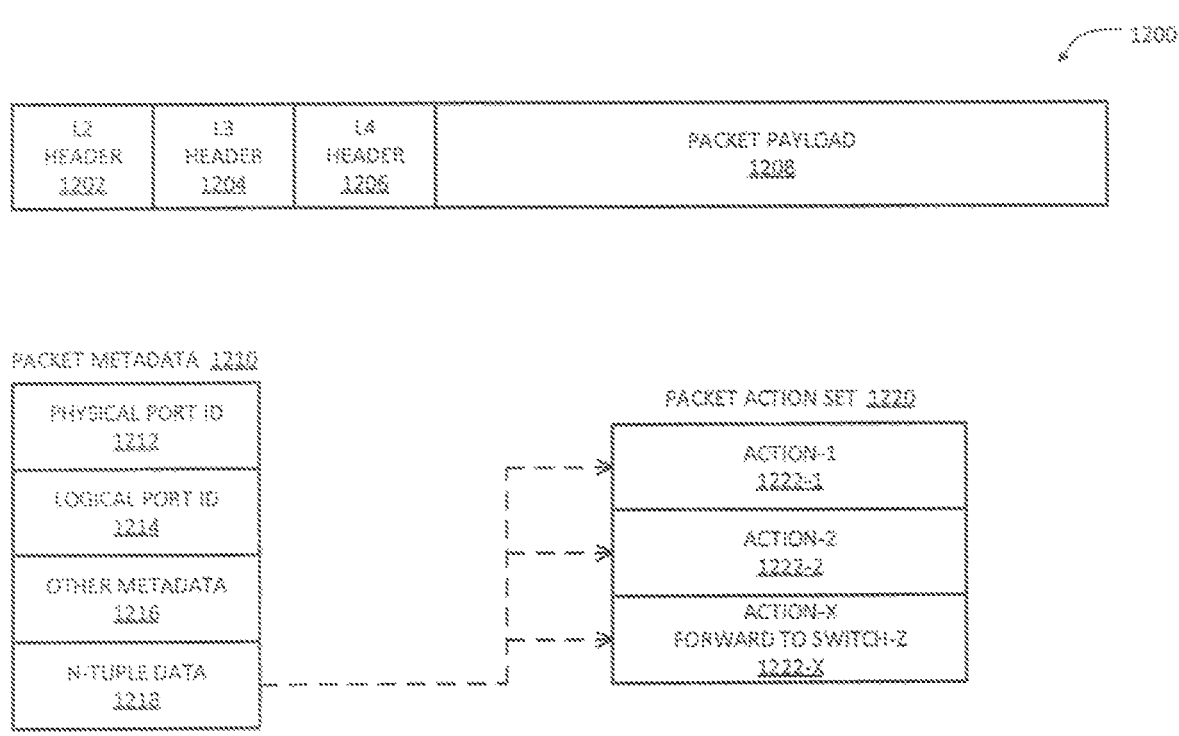
FIG. 12 depicts an example packet structure and associated match-action rule(s) illustrative for purposes of an embodiment of the present invention.

FIG. 12 depicts an example packet structure and associated match-action rule illustrative for purposes of an embodiment of the present invention. Reference numeral 1200 refers to an example packet including appropriate L2/L3/L4 header fields 1202, 1204, 1206, respectively, and a packet payload portion 1208, which may contain any data relating to a subscriber session, e.g., bearer, media, and/or control signaling data. One or more additional structures may be maintained in the packet processing pipeline of a switching node that may contain information regarding packet metadata 1210 as well as a set of actions 1220 to be applied to a packet. By way of illustration, physical port ID 1212, logical port ID 1214, other metadata 1216 as well as n-tuple data 1218 may comprise packet metadata 1210. Applicable actions rules 1220 may comprise actions for discarding, modifying, queuing, or forwarding the packet to a particular destination, which are exemplified as actions 1222-1 to 1222-X in FIG. 12. Depending on whether version 1.0 or subsequent versions (e.g., ver. 1.1.0) of the OpenFlow protocol is used, an embodiment of the present invention may involve using a FlowMod message, or a variation thereof with respect to providing suitable match-action rules as well as extensions as previously noted.

Figure 13:
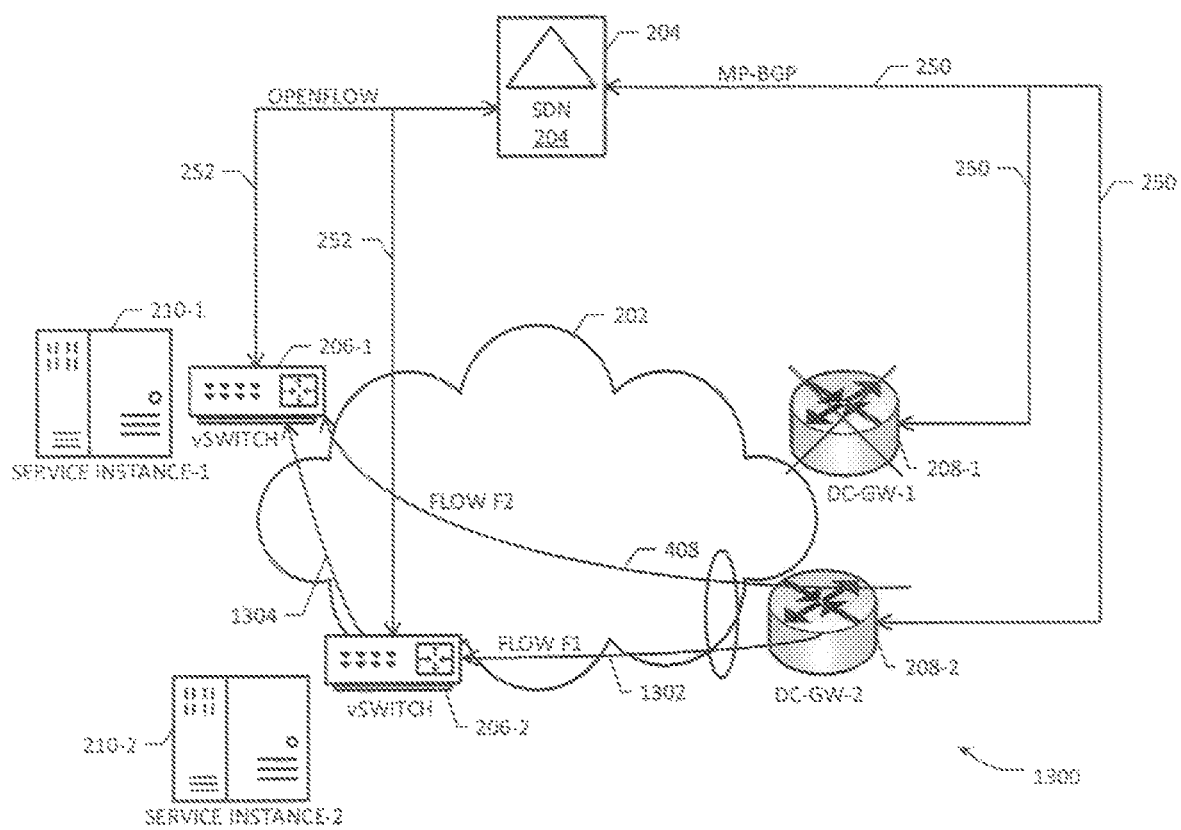
FIGS. 13-15 depict example solution scenarios in the data center of FIG. 2 according to one or more embodiments of the present invention.
Figure 14:
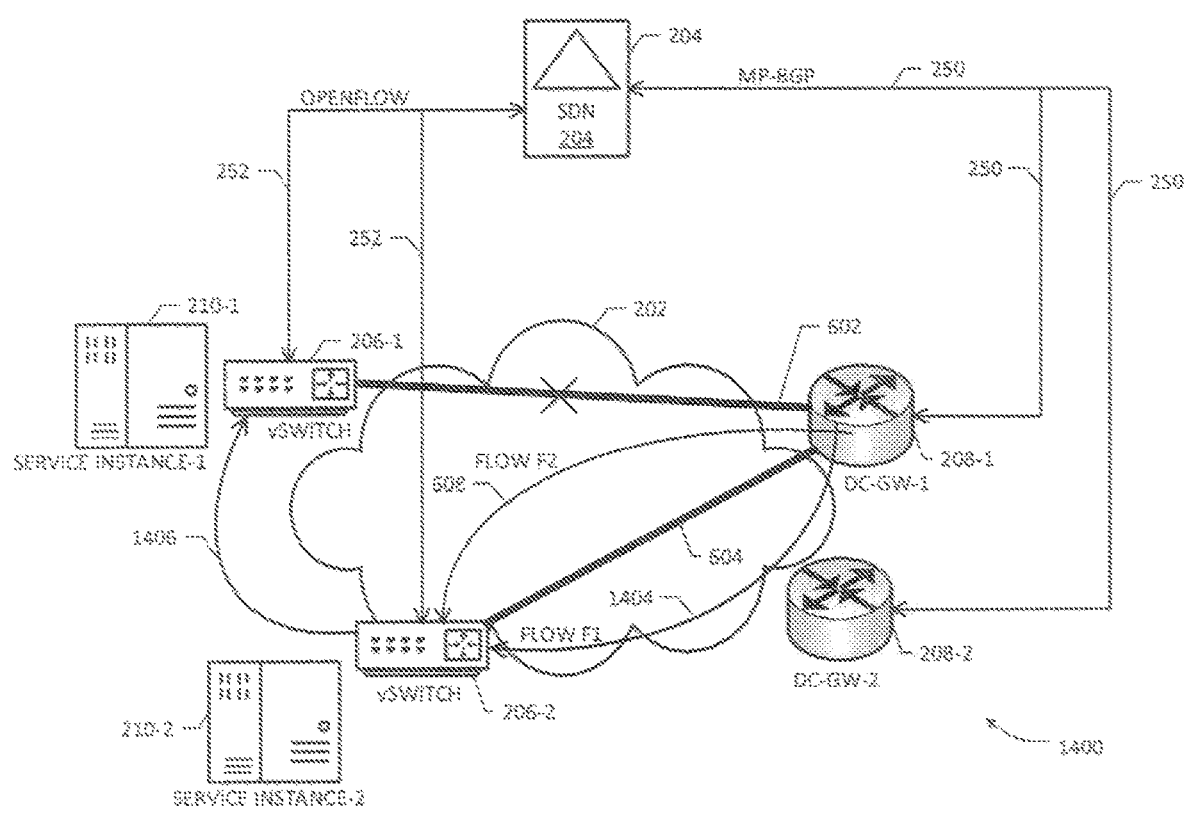
Figure 15:
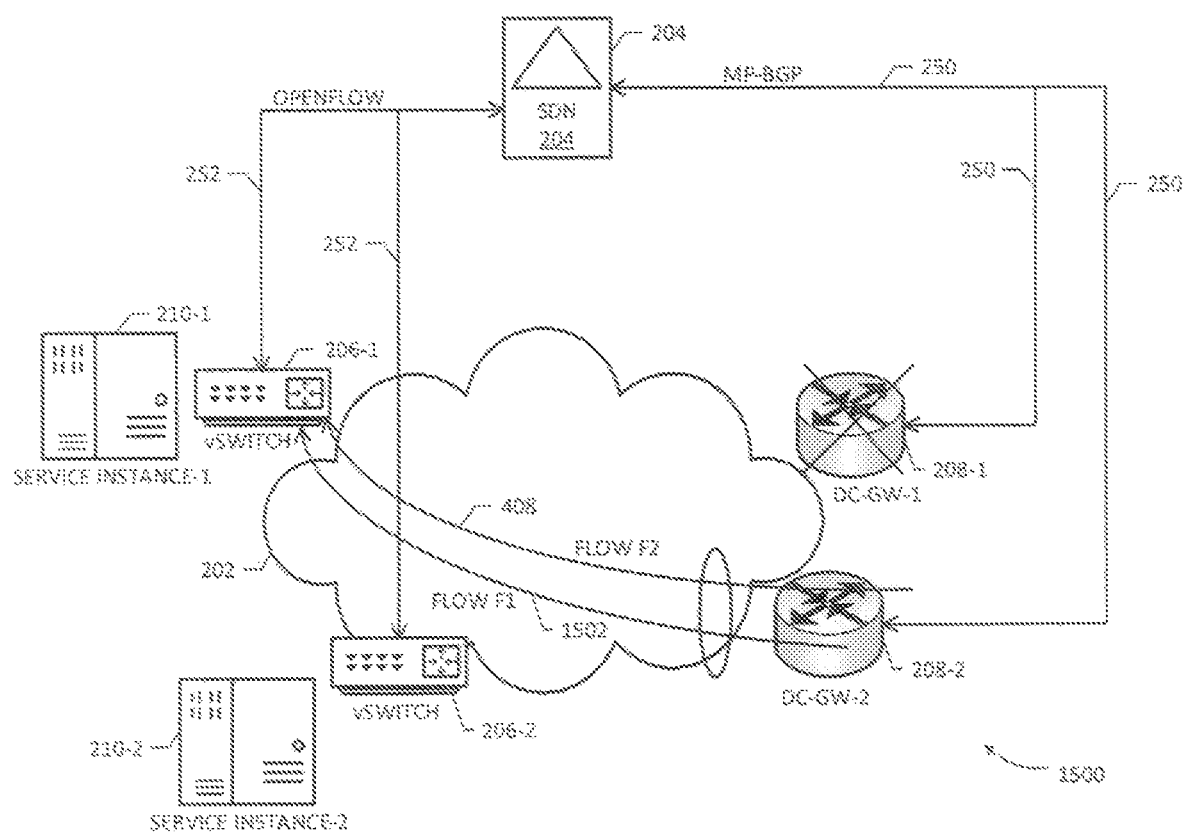

FIGS. 13-15 depict example solution scenarios in the data center of FIG. 2 according to one or more embodiments of the present invention, particularly in relation to the failure scenarios of FIGS. 4-6. Analogous to the failure scenario in FIG. 4, the solution scenario 1300 of FIG. 13 illustrates a situation where DC-GW1 208-1 has failed and the packet traffic flows have failed over to DC-GW2 208-2. Flow F1 1302 is now routed from DC-GW2 208-2 to vSwitch 206-2 pursuant to the ECMP routing of DC-GW2 208-2. When the packets arrive at vSwitch 206-2, they are matched against an action rule (e.g., a redirection of packets) provided by SDN controller 204 for the n-tuple of F1 flow, which indicates that the packets should be redirected to vSwitch 206-1, as shown by the redirection flow 1304. As there is no mach-action for Flow F2 408, it remains unaffected in the illustrative scenario. A similar redirection flow for F1 will be obtained where the external link to DC-GW1 208-1 for F1 flow is compromised in some fashion, similar to the failure scenario 500 shown in FIG. 5.

In the solution scenario 1400 shown in FIG. 14, inter-nodal path 602, which may also be referred to as intra-DC path, between vSwitch 206-1 and DC-GW1 208-1 experiences a failure, similar to the failure scenario 600 shown in FIG. 6. Whereas Flow F1 1404 is routed to vSwitch 206-2 via an alternative inter-nodal path 604, the programmed match-action rules at vSwitch 206-2 for the n-tuple corresponding to F1 are operative for redirecting the flow to vSwitch 206-1 similar to the foregoing scenarios, as exemplified by redirection flow 1406.

Redirection of flows that have/require stickiness as set forth above results in what may be referred to as a "Two-Hop" situation, in the sense that the leaf vSwitch nodes are required to add an extra "hop" to the "correct" switch (i.e., vSwitch that has acquired a PDP context for a flow). As there may be many intermediary nodes, such as other switches, routers, bridges, brouters, etc, along the intra-DC paths, a "Hop" in this context simply means another vSwitch⇔vSwitch segment that results from the match-action rule application, not necessarily an actual "hop" to the nearest node along the path.

Although the Two-Hop solution embodiments set forth herein can advantageously address the flow stickiness under various failure scenarios, they may engender additional latency and/or congestion in an example DC environment because of the extra hops. With respect to the situation where an inter-nodal link failure is encountered, the latency and/or congestion issues may not last long and/or the impact may not be severe since the inter-nodal links can undergo self-correction or annealing (e.g., because the underlying fabric routing protocol may converge relatively quickly). On the other hand, when a gateway failure situation is encountered, the latency and/or congestion can become significant in an example DC environment because no self-annealing of the network fabric is involved. To address this situation, embodiments relating to direct forwarding, e.g., as set forth in FIGS. 8A-8C based on bypass routes advertised via BGP-FS, can be particularly advantageous since they "short-circuit" the extra hop and instead forward the packets for a sticky flow directly to the correct vSwitch node as identified by an n-tuple hit the gateway's n-tuple match FIB (i.e., FlowSpec FIB). In the example solution scenario 1500 shown in FIG. 15, DC-GW1 208-1 has failed and the packet traffic flows have failed over to DC-GW2 208-2. Flow F1 1502 is now routed from DC-GW2 208-2 to vSwitch 206-2 pursuant to the BGS-FS path advertised by SDN controller 204 instead of using conventional ECMP routing of DC-GW2 208-2. As hits in ECMP FIBs are avoided in such a scenario, this type of routing may be referred to as "ECMP hitless" routing. As before, Flow F2 408 remains unaffected since the conventional ECMP routing continues to be used for this flow.

Regardless of whether direct forwarding by gateway nodes or redirection by switching nodes is implemented, an example embodiment of the present invention may include certain mechanisms for removing stale flow entries, as previously noted in reference to FIGS. 8A-8C as well as FIGS. 11A and 11B. Once a flow terminates, there would be no further packets that match the corresponding flow entry, and eventually an IDLE timer will expire. A switching node, in response, may delete the flow entry and generate a notification to an SDN controller in an example embodiment. Responsive to a flow entry deletion notification or message, the SDN controller may proceed to remove the corresponding flow in its cache. Furthermore, the SDN controller may also withdraw or inactivate the corresponding n-tuple route advertised to the gateway nodes using BGP-FS, as set forth hereinabove. Depending on whether direct forwarding by gateway nodes or redirection by switching nodes, or a combination of both, is implemented in an example DC environment, suitable timer mechanisms, stale entry deletion procedures and/or inactivation of BGP-FS routes may be accordingly configured in an embodiment.

In the example embodiments set forth herein, a DC switching node is configured to forward a packet from every new flow to the associated SDN controller. As the networks scale, processing of every new flow can create challenges at the controller. Accordingly, additional and/or alternative variations may be implemented in accordance with the teachings of the present patent application to address potential scalability challenges. It should be noted that the impact of DC-GW failures may not be critical for all flows. For example, certain UDP flows need not require being directed to the same service instance. By providing a list of services for which the (dis)connection is critical (e.g., a white list or a black list), an SDN controller may be configured to selectively enable one or more of the features of the present invention for a minor subset of flows. By reducing the number of punt packets to the controller, it is possible to scale an embodiment of the present invention to larger DC networks.

Further, session termination due to DC-GW failures particularly penalizes those flows that already have sent substantial amount of data (as opposed to flows that have sent only a small amount of traffic). Accordingly, it is more important to ensure that the session does not terminate for such large flows. To that end, an embodiment may provide that instead of punting packet from every new flow to the controller, the learning feature will only add a new entry as discussed hereinabove to certain flows. Subsequent packets will be forwarded based on the new entry. Thereafter, the switch can send a notification to the controller only if the flow counter exceeds a preconfigured value (e.g., greater than MB). In other words, flow session is maintained during a DC-GW failure only for those flows that have already sent 1 MB. An example embodiment may, therefore, utilize a statistics-based trigger in the OpenFlow specification (referred to as OFPIT_STAT_TRIGGER, supported in OF ver. 1.5) to further modulate the packet punting behavior of a DC switching node. Given that not all flows transmit 1 MB, the number of punt packets received by the controller can be substantially reduced in such an arrangement, leading to increased scalability in larger networks.

Skilled artisans will appreciate upon reference hereto that example embodiments of the present invention advantageously overcome various shortcomings and deficiencies of the existing DC management solutions. For example, where symmetric DC-GWs that use identical hashing mechanisms are provided (so as to ensure consistency of the ECMP forwarding behavior of a gateway to which the packet flows are failed over), such hashing mechanisms for ECMP are often proprietary, leading to a closed ecosystem of data centers. Further, symmetric hardware may require the data center to be set up with DC-GWs from the same vendor and may further require the hardware and software versions on the two DC-GWs to be identical. This would further reduce interoperability, giving rise to significant impediments in organic expansion of DC networks.

Another existing solution involves service instance TCP state mirroring a DC environment, where the TCP state of all service instances is mirrored. Consequently, if a flow is redirected to another service instance, it would have the necessary state information to process the packet and proceed further. However, this arrangement poses severe constraints on scalability as more service instances are deployed, the number of mirroring sessions will increase dramatically (e.g., quadratically). Also, such an arrangement is not an efficient solution since every service that is deployed in the data center is mirrored while not all flows require state consistency. Yet another existing solution involves using load balancing as a service (LBasS), where a stateful load balancer in cloud-centric deployments for load balancing sticky flows. However, it should be noted that the load balancer itself introduces an additional hop on the data plane, which may not be desirable in latency sensitive applications such as NFV. Additionally, the load balancer itself might have multiple instances, and spraying the packets across multiple instances of the load balancer itself relies on ECMP (effectively adding the same problem on another level).

Figure 16:
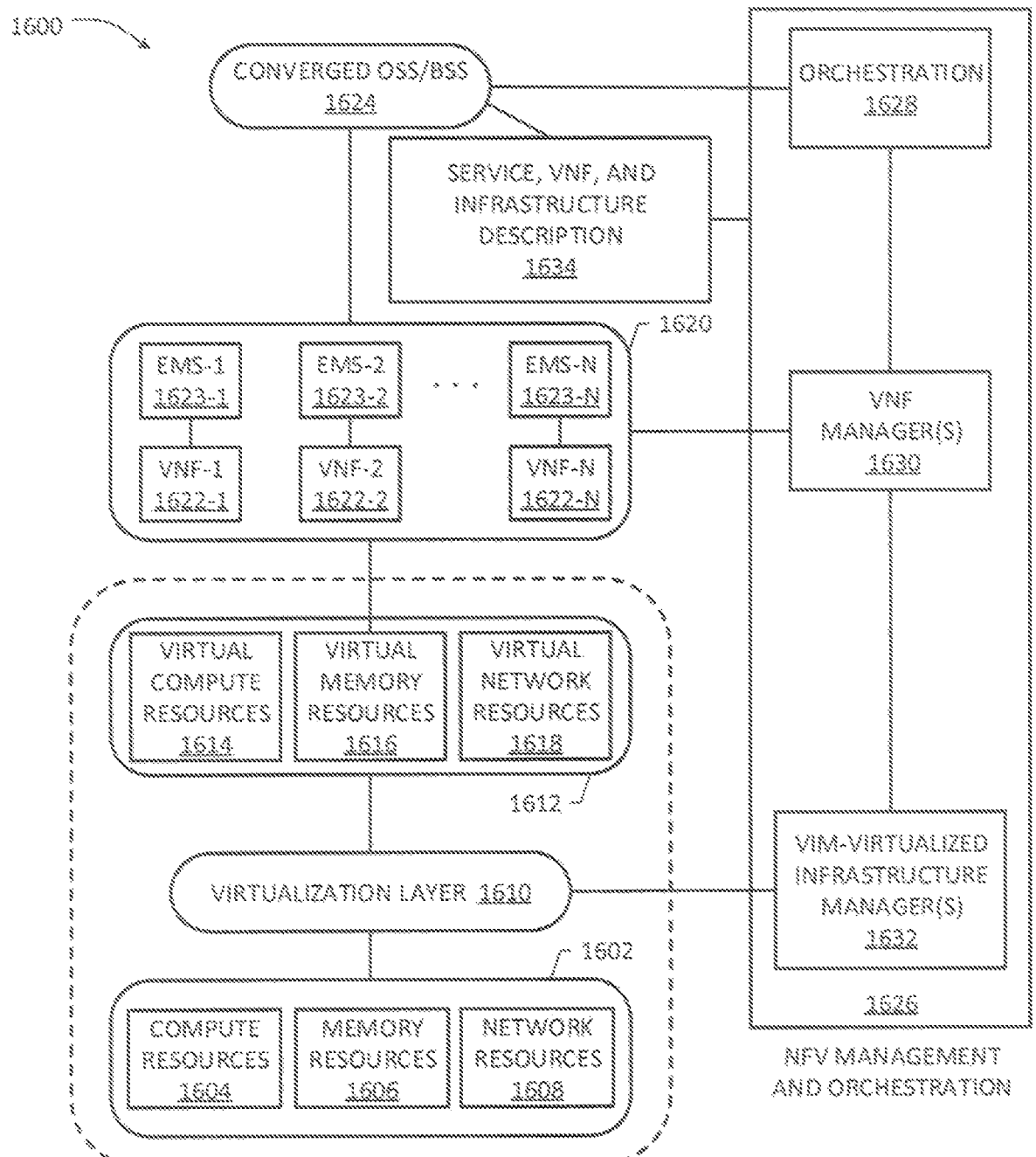
FIG. 16 depicts a network function virtualization (NFV) architecture that may be implemented in conjunction with a data center deployment of the present invention.

Turning to FIG. 16, depicted therein is a network function virtualization (NFV) architecture 1600 that may be applied in conjunction with a data center deployment of the present invention, e.g., similar to the embodiments set forth in FIGS. 1 and 2. Various physical resources and services executing in an example DC environment may be provided as virtual appliances wherein the resources and service functions are virtualized into suitable virtual network functions (VNFs) via a virtualization layer 1610. Resources 1602 comprising compute resources 1604, memory resources 1606, and network infrastructure resources 1608 are virtualized into corresponding virtual resources 1612 wherein virtual compute resources 1614, virtual memory resources 1616 and virtual network resources 1618 are collectively operative to support a VNF layer 1620 including a plurality of VNFs 1622-1 to 1622-N, which may be managed by respective element management systems (EMS) 1623-1 to 1623-N. Virtualization layer 1610 (also sometimes referred to as virtual machine monitor (VMM) or "hypervisor", similar to hypervisors 120 and 140 in FIG. 1) together with the physical resources 1602 and virtual resources 1612 may be referred to as NFV infrastructure (NFVI) of a network environment. Overall NFV management and orchestration functionality 1626 may be supported by one or more virtualized infrastructure managers (VIMs) 1632, one or more VNF managers 1630 and an orchestrator 1628, wherein VIM 1632 and VNF managers 1630 are interfaced with virtualization layer and VNF layer, respectively. A converged OSS platform 1624 (which may be integrated or co-located with a BSS in some arrangements) is responsible for network-level functionalities such as network management, fault management, configuration management, service management, and subscriber management, etc., as well as interfacing with DC controllers, as noted previously. In one arrangement, various OSS components of the OSS platform 1624 may interface with VNF layer 1620 and NFV orchestration 1628 via suitable interfaces. In addition, OSS/BSS 1624 may be interfaced with a configuration module 1634 for facilitating service instantiation and chaining, VNF and infrastructure description input, as well as policy-based flow management. Broadly, NFV orchestration 1628 involves generating, maintaining and tearing down of network services or service functions supported by corresponding VNFs, including creating end-to-end services over multiple VNFs in a network environment, (e.g., service chaining for various data flows from ingress nodes to egress nodes). Further, NFV orchestrator 1628 is also responsible for global resource management of NFVI resources, e.g., managing compute, storage and networking resources among multiple VIMs in the network.

Figure 17A:
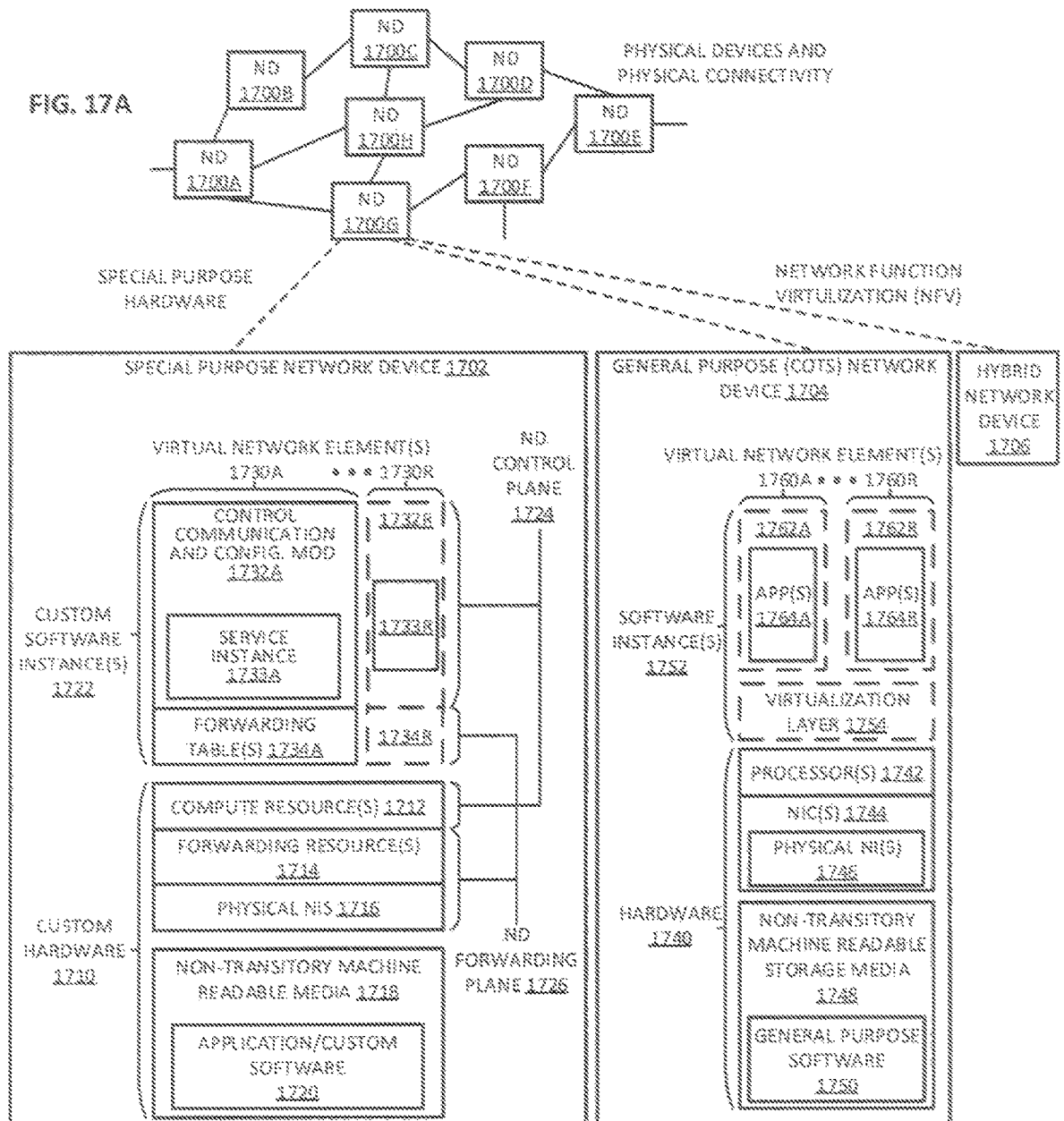
FIGS. 17A/17B illustrate connectivity between network devices (NDs) of an exemplary data center and/or associated network environment, as well as three exemplary implementations of the NDs, according to some embodiments of the present invention.

FIGS. 17A/17B illustrate connectivity between network devices (NDs) within an exemplary DC network, as well as three exemplary implementations of the NDs, according to some embodiments of the invention wherein at least a portion of the DC network and/or associated nodes/components shown in some of the Figures previously discussed may be implemented in a virtualized environment that may involve, supplement and/or complement the embodiments of FIGS. 1, 2 and 16. In particular, FIG. 17A shows NDs 1700A-H, which may be representative of various servers, service nodes, switching nodes, gateways, controller nodes, as well as other network elements of a DC network environment, and the like, wherein example connectivity is illustrated by way of lines between A-B, B-C, C-D, D-E, E-F, F-G, and A-G, as well as between H and each of A, C, D, and G. As noted elsewhere in the patent application, such NDs may be provided as physical devices, and the connectivity between these NDs can be wireless or wired (often referred to as a link). An additional line extending from NDs 1700A, E, and F illustrates that these NDs may act as ingress and egress nodes for the network (and thus, these NDs are sometimes referred to as edge NDs; while the other NDs may be called core NDs).

Two of the exemplary ND implementations in FIG. 17A are: (1) a special-purpose network device 1702 that uses custom application—specific integrated—circuits (ASICs) and a proprietary operating system (OS); and (2) a general purpose network device 1704 that uses common off-the-shelf (COTS) processors and a standard OS.

The special-purpose network device 1702 includes appropriate hardware 1710 (e.g., custom or application-specific hardware) comprising compute resource(s) 1712 (which typically include a set of one or more processors), forwarding resource(s) 1714 (which typically include one or more ASICs and/or network processors), and physical network interfaces (NIs) 1716 (sometimes called physical ports), as well as non-transitory machine readable storage media 1718 having stored therein suitable application-specific software or program instructions 1720 (e.g., switching, routing, call processing, etc). A physical NI is a piece of hardware in an ND through which a network connection (e.g., wirelessly through a wireless network interface controller (WNIC) or through plugging in a cable to a physical port connected to a network interface controller (NIC)) is made, such as those shown by the connectivity between NDs 1700A-H. During operation, the application software 1020 may be executed by the hardware 1710 to instantiate a set of one or more application-specific or custom software instance(s) 1722. Each of the custom software instance(s) 1722, and that part of the hardware 1710 that executes that application software instance (be it hardware dedicated to that application software instance and/or time slices of hardware temporally shared by that application software instance with others of the application software instance(s) 1722), form a separate virtual network element 1730A-R. Each of the virtual network element(s) (VNEs) 1730A-R includes a control communication and configuration module 1732A-R (sometimes referred to as a local control module or control communication module) and forwarding table(s) 1734A-R with respect to suitable application/service instances 1733A-R, such that a given virtual network element (e.g., 1730A) includes the control communication and configuration module (e.g., 1732A), a set of one or more forwarding table(s) (e.g., 1734A), and that portion of the application hardware 1710 that executes the virtual network element (e.g., 1730A) for supporting one or more suitable application/service instances 1733A, and the like.

In an example implementation, the special-purpose network device 1702 is often physically and/or logically considered to include: (1) a ND control plane 1724 (sometimes referred to as a control plane) comprising the compute resource(s) 1712 that execute the control communication and configuration module(s) 1732A-R; and (2) a ND forwarding plane 1726 (sometimes referred to as a forwarding plane, a data plane, or a bearer plane) comprising the forwarding resource(s) 1714 that utilize the forwarding or destination table(s) 1734A-R and the physical NIs 1716. By way of example, where the ND is a DC node, the ND control plane 1724 (the compute resource(s) 1712 executing the control communication and configuration module(s) 1732A-R) is typically responsible for participating in controlling how bearer traffic (e.g., voice/data/video) is to be routed. Likewise, ND forwarding plane 1726 is responsible for receiving that data on the physical NIs 1716 (e.g., similar to I/Fs 1818 and 1820 in FIG. 18, described below) and forwarding that data out the appropriate ones of the physical NIs 1716 based on the forwarding information.

Figure 17B:
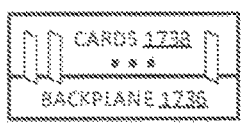

FIG. 17B illustrates an exemplary way to implement the special-purpose network device 1702 according to some embodiments of the invention, wherein an example special-purpose network device includes one or more cards 1738 (typically hot pluggable) coupled to an interconnect mechanism. While in some embodiments the cards 1738 are of two types (one or more that operate as the ND forwarding plane 1726 (sometimes called line cards), and one or more that operate to implement the ND control plane 1724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway), etc.). By way of example, a service card may be used to terminate IPsec tunnels and execute the attendant authentication and encryption algorithms. These cards may be coupled together through one or more interconnect mechanisms illustrated as backplane 1736 (e.g., a first full mesh coupling the line cards and a second full mesh coupling all of the cards).

Returning to FIG. 17A, an example embodiment of the general purpose network device 1704 includes hardware 1740 comprising a set of one or more processor(s) 1742 (which are often COTS processors) and network interface controller(s) 1744 (NICs; also known as network interface cards) (which include physical NIs 1746), as well as non-transitory machine readable storage media 1748 having stored therein software 1750, e.g., general purpose operating system software, similar to the embodiments set forth below in reference to FIG. 19 in one example. During operation, the processor(s) 1742 execute the software 1750 to instantiate one or more sets of one or more applications 1764A-R with respect to facilitating DC service instances. While one embodiment does not implement virtualization, alternative embodiments may use different forms of virtualization—represented by a virtualization layer 1754 and software containers 1762A-R. For example, one such alternative embodiment implements operating system-level virtualization, in which case the virtualization layer 1754 represents the kernel of an operating system (or a shim executing on a base operating system) that allows for the creation of multiple software containers 1762A-R that may each be used to execute one of the sets of applications 1764A-R. In this embodiment, the multiple software containers 1762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1754 represents a hypervisor (sometimes referred to as a VMM as noted elsewhere in the present patent application) or a hypervisor executing on top of a host operating system; and (2) the software containers 1762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1764A-R, as well as the virtualization layer 1054 and software containers 1762A-R if implemented, are collectively referred to as software instance(s) 1752. Each set of applications 1764A-R, corresponding software container 1762A-R if implemented, and that part of the hardware 1740 that executes them (be it hardware dedicated to that execution and/or time slices of hardware temporally shared by software containers 1762A-R), forms a separate virtual network element(s) 1760A-R.

The virtual network element(s) 1760A-R perform similar functionality to the virtual network element(s) 1730A-R— e.g., similar to the control communication and configuration module(s) 1732A and forwarding table(s) 1734A (this virtualization of the hardware 1740 is sometimes referred to as NFV architecture, as mentioned elsewhere in the present patent application. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 1762A-R differently. For example, while embodiments of the invention may be practiced in an arrangement wherein each software container 1762A-R corresponds to one VNE 1760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1762A-R to VNEs also apply to embodiments where such a finer level of granularity is used.

In certain embodiments, the virtualization layer 1754 includes a virtual switch that provides similar forwarding services as a physical Ethernet switch. Specifically, this virtual switch forwards traffic between software containers 1762A-R and the NIC(s) 1744, as well as optionally between the software containers 1762A-R. In addition, this virtual switch may enforce network isolation between the VNEs 1760A-R that by policy are not permitted to communicate with each other (e.g., by honoring virtual local area networks (VLANs)).

The third exemplary ND implementation in FIG. 17A is a hybrid network device 1706, which may include both custom ASICs/proprietary OS and COTS processors/standard OS in a single ND or a single card within an ND. In certain embodiments of such a hybrid network device, a platform VM (i.e., a VM that implements the functionality of the special-purpose network device 1702) could provide for para-virtualization to the application-specific hardware present in the hybrid network device 1706 for effectuating one or more components, blocks, modules, and functionalities of an example DC network environment.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1730A-R, VNEs 1760A-R, and those in the hybrid network device 1706) receives data on the physical NIs (e.g., 1716, 1746) and forwards that data out the appropriate ones of the physical NIs (e.g., 1716, 1746).

Figure 18:
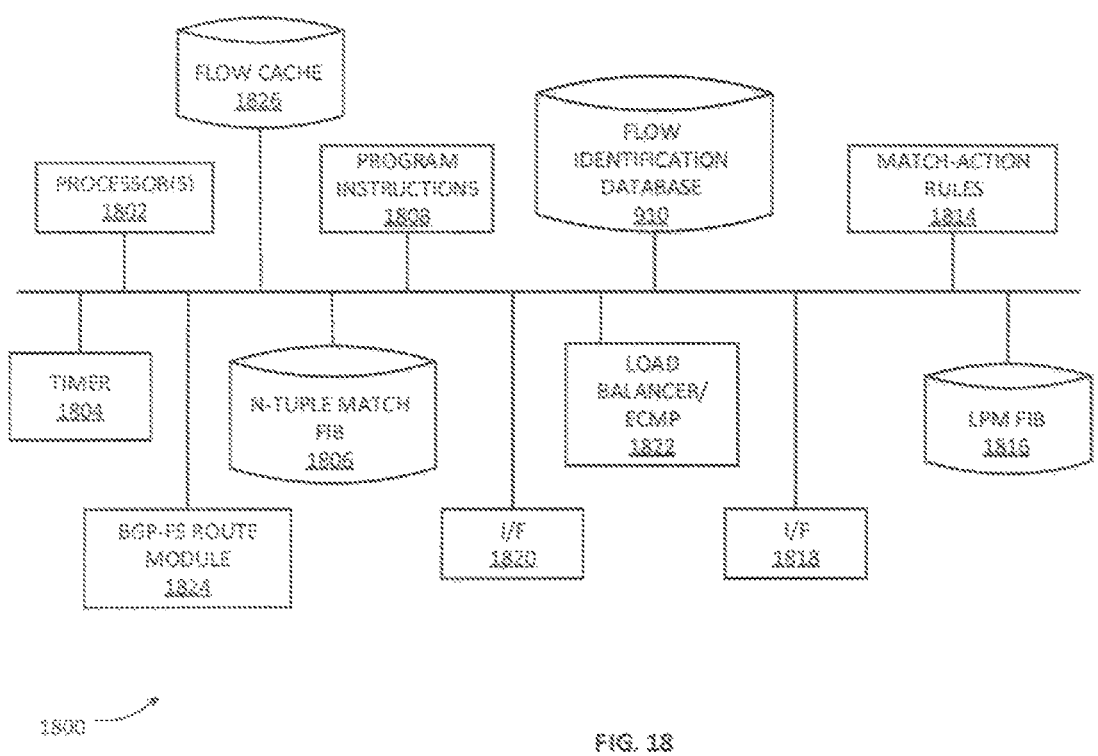
FIG. 18 depicts a block diagram of a computer-implemented platform or apparatus that may be (re)configured and/or (re)arranged as a data center switching node, gateway node and/or associated SDN controller according to an embodiment of the present invention.

Turning to FIG. 18, depicted therein is a block diagram of a computer-implemented apparatus 1800 that may be (re)configured and/or (re)arranged as a platform, server, node or element, e.g., a DC switching node, a DC gateway node, and/or associated SDN controller, to effectuate an example DC failure management system and method according to an embodiment of the present patent disclosure. It should be appreciated that apparatus 1800 may also be implemented as part of a distributed data center platform in some arrangements, including, e.g., geographically distributed DC networks. One or more processors 1802 may be operatively coupled to various modules that may be implemented in persistent memory for executing suitable program instructions or code portions with respect to effectuating various aspects of DC failure management, e.g., load balancing, BGP-FS route computing, flow caching, policy configuration, etc. as exemplified by one or more modules as illustrated. As a DC switching node, apparatus 1800 may include a new flow identification database 1810 as well as a match-action rule database 1814. In a DC gateway node implementation, apparatus 1800 may include an FS route database (FIB) 1806 as well as an LPM FIB 1816 and associated ECMP/load balancing mechanism 1822. As an SDN controller, a flow cache 1826 may be implemented as well as suitable program instructions for executing various processes set forth in the present patent application. A suitable timer mechanism 1804 may be provided as part of one or more implementations for aging out stale flow entries from different nodes of the DC network. Depending on the implementation, appropriate "upstream" interfaces (I/F) 1818 and/or "downstream" I/Fs 1820 may be provided for interfacing with external nodes (e.g., OSS/BSS nodes or customer management nodes), other network elements, and/or other OSS components, etc. Accordingly, depending on the context, interfaces selected from interfaces 1818, 1820 may sometimes be referred to as a first interface, a second interface, and so on. In a further arrangement, a Big Data analytics module (not shown in this FIG.) may be operative in conjunction with a DC network environment where vast quantities of subscriber end station data, customer/tenant service data, service state information, etc. may need to be curated, manipulated, and analyzed for facilitating DC operations in a multi-domain heterogeneous network environment.

Accordingly, various hardware and software blocks configured for effectuating an example DC failure management scheme including flow redirection and/or direct forwarding functionality may be embodied in NDs, NEs, NFs, VNE/VNF/VND, virtual appliances, virtual machines, and the like, as well as electronic devices and machine-readable media, which may be configured as any of the apparatuses described herein. One skilled in the art will therefore recognize that various apparatuses and systems with respect to the foregoing embodiments, as well as the underlying network infrastructures set forth above may be architected in a virtualized environment according to a suitable NFV architecture in additional or alternative embodiments of the present patent disclosure as noted above in reference to FIG. 16. Accordingly, for purposes of at least one embodiment of the present invention, the following detailed description may be additionally and/or alternatively provided, mutatis mutandis, in an example implementation with respect to the DC components and/or the associated network elements of a network environment.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection or channel and/or sending data out to other devices via a wireless connection or channel. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s).

In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) or network element (NE) as set hereinabove is an electronic device that communicatively interconnects other electronic devices on the network (e.g., other network devices, end-user devices, etc.). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). The apparatus, and method performed thereby, of the present invention may be embodied in one or more ND/NE nodes that may be, in some embodiments, communicatively connected to other electronic devices on the network (e.g., other network devices, servers, nodes, terminals, etc.). The example NE/ND node may comprise processor resources, memory resources, and at least one interface. These components may work together to provide various DC functionalities as disclosed herein.

Memory may store code (which is composed of software instructions and which is sometimes referred to as computer program code or a computer program) and/or data using non-transitory machine-readable (e.g., computer-readable) media, such as machine-readable storage media (e.g., magnetic disks, optical disks, solid state drives, ROM, flash memory devices, phase change memory) and machine-readable transmission media (e.g., electrical, optical, radio, acoustical or other form of propagated signals—such as carrier waves, infrared signals). For instance, memory may comprise non-volatile memory containing code to be executed by processor. Where memory is non-volatile, the code and/or data stored therein can persist even when the network device is turned off (when power is removed). In some instances, while network device is turned on that part of the code that is to be executed by the processor(s) may be copied from non-volatile memory into volatile memory of network device.

The at least one interface may be used in the wired and/or wireless communication of signaling and/or data to or from network device. For example, interface may perform any formatting, coding, or translating to allow network device to send and receive data whether over a wired and/or a wireless connection. In some embodiments, interface may comprise radio circuitry capable of receiving data from other devices in the network over a wireless connection and/or sending data out to other devices via a wireless connection. In some embodiments, interface may comprise network interface controller(s) (NICs), also known as a network interface card, network adapter, local area network (LAN) adapter or physical network interface. The NIC(s) may facilitate in connecting the network device to other devices allowing them to communicate via wire through plugging in a cable to a physical port connected to a NIC. As explained above, in particular embodiments, the processor may represent part of interface, and some or all of the functionality described as being provided by interface may be provided more specifically by processor.

The components of network device are each depicted as separate boxes located within a single larger box for reasons of simplicity in describing certain aspects and features of network device disclosed herein. In practice however, one or more of the components illustrated in the example network device may comprise multiple different physical elements One or more embodiments described herein may be implemented in the network device by means of a computer program comprising instructions which, when executed on at least one processor, cause the at least one processor to carry out the actions according to any of the invention's features and embodiments, where appropriate. While the modules are illustrated as being implemented in software stored in memory, other embodiments implement part or all of each of these modules in hardware.

In one embodiment, the software implements the modules described with regard to the Figures herein. During operation, the software may be executed by the hardware to instantiate a set of one or more software instance(s). Each of the software instance(s), and that part of the hardware that executes that software instance (be it hardware dedicated to that software instance, hardware in which a portion of available physical resources (e.g., a processor core) is used, and/or time slices of hardware temporally shared by that software instance with others of the software instance(s)), form a separate virtual network element. Thus, in the case where there are multiple virtual network elements, each operates as one of the network devices.

Some of the described embodiments may also be used where various levels or degrees of virtualization has been implemented. In certain embodiments, one, some or all of the applications relating to a DC network architecture may be implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware directly on a hypervisor (in which case the unikernel is sometimes described as running within a LibOS virtual machine), or in a software container, embodiments can be implemented fully with unikernels running directly on a hypervisor represented by virtualization layer, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented are collectively referred to as software instance(s). Each set of applications, corresponding virtualization construct if implemented, and that part of the hardware that executes them (be it hardware dedicated to that execution and/or time slices of hardware temporally shared by software containers), forms a separate virtual network element(s).

A virtual network is a logical abstraction of a physical network that provides network services (e.g., L2 and/or L3 services). A virtual network can be implemented as an overlay network (sometimes referred to as a network virtualization overlay) that provides network services (e.g., Layer 2 (L2, data link layer) and/or Layer 3 (L3, network layer) services) over an underlay network (e.g., an L3 network, such as an Internet Protocol (IP) network that uses tunnels (e.g., generic routing encapsulation (GRE), Layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services also include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Example network services that may be hosted by a data center may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Embodiments of a DC environment and/or associated heterogeneous multi-domain networks may involve distributed routing, centralized routing, or a combination thereof. The distributed approach distributes responsibility for generating the reachability and forwarding information across the NEs; in other words, the process of neighbor discovery and topology discovery is distributed. For example, where the network device is a traditional router, the control communication and configuration module(s) of the ND control plane typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane. The ND control plane programs the ND forwarding plane with information (e.g., adjacency and route information) based on the routing structure(s). For example, the ND control plane programs the adjacency and route information into one or more forwarding table(s) (e.g., Forwarding Information Base (FIB), Label Forwarding Information Base (LFIB), and one or more adjacency structures) on the ND forwarding plane. For Layer 2 forwarding, the ND can store one or more bridging tables that are used to forward data based on the Layer 2 information in that data. While the above example uses the special-purpose network device, the same distributed approach can be implemented on a general purpose network device and a hybrid network device, e.g., as exemplified in the embodiments of FIGS. 17A/17B described above.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Furthermore, skilled artisans will also appreciate that where an example DC platform is implemented in association with cloud-computing environment, it may comprise one or more of private clouds, public clouds, hybrid clouds, community clouds, distributed clouds, multiclouds and interclouds (e.g., "cloud of clouds"), and the like, wherein various types of services and applications may be supported. Example hosted services/applications may include, but not limited to: cloud storage resources, processor compute resources, network bandwidth resources, load balancing services, virtualized network infrastructure resources, Software as a Service (SaaS) services, Platform as a Service (PaaS) services, Infrastructure as a Service (IaaS) services, streaming media services, email services, social media network services, virtual routing services, voice telephony/VoIP services, and one or more inline services such as, e.g., Deep Packet Inspection (DPI) services, Virus Scanning (VS) services, Intrusion Detection and Prevention (IDP) services, Firewall (FW) filtering services and Network Address Translation (NAT) services, and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method operating at a Software Defined Networking (SDN) controller associated with a data center having a plurality of switching nodes coupled in a data center network fabric to a plurality of gateway nodes, the method comprising:
    receiving a first packet of a packet flow from a first switching node coupled to a service instance hosted by the data center, the packet flow having with an n-tuple identifier set and flowing from a gateway node pursuant to a subscriber session via an external network;
    determining that the packet flow requires flow stickiness with respect to the subscriber session; and
    responsive to the determining, programming each switching node other than the first switching node to redirect any packets of the packet flow received by the switching nodes to the first switching node, the packets arriving at the switching nodes from at least a subset of the plurality of gateway nodes according to respective Equal Cost Multi Path (ECMP) routing paths.

2. The method as recited in claim 1, wherein each switching node is programmed by the SDN controller to redirect the packets of the packet flow by sending one or more OpenFlow specification match-action rules to the switching nodes that identify the first switching node as a destination node.

3. The method as recited in claim 1, further comprising: generating instructions to the plurality of switching nodes to forward first packets of new packet flows respectively received thereat to the SDN controller, the first packets each containing respective n-tuple identifier sets.

4. The method as recited in claim 1, further comprising:
    determining that the subscriber session has terminated; and
    responsive to the determination that the subscriber session has terminated, instructing the switching nodes to inactivate the match-action rules with respect to the packet flow associated with the subscriber session.

5. The method as recited in claim 1, wherein the n-tuple identifier set comprises at least one of: a source IP address, a source port number, a destination IP address, a destination port number and a protocol in use.

6. The method as recited in claim 1, further comprising: receiving a subscriber service policy message that the subscriber session requires flow stickiness.

7. The method as recited in claim 1, further comprising: performing a statistical analysis of the packet flow to determine that the packet flow requires flow stickiness.

8. A Software Defined Networking (SDN) controller associated with a data center having a plurality of switching nodes coupled in a data center network fabric to a plurality of gateway nodes, the SDN controller comprising:
    one or more processors; and
    a persistent memory module coupled to the one or more processors and having program instructions thereon, which when executed by the one or more processors perform the following:
        generate instructions to the plurality of switching nodes to forward first packets of new packet flows respectively received thereat to the SDN controller, the first packets each containing respective n-tuple identifier sets;
        responsive to the instructions, receive a first packet of a packet flow from a first switching node coupled to a service instance hosted by the data center, the packet flow having with an n-tuple identifier set and flowing from a gateway node pursuant to a subscriber session via an external network;
        determine that the packet flow requires flow stickiness with respect to the subscriber session; and
        responsive to the determining, program each switching node other than the first switching node to redirect any packets of the packet flow received by the switching nodes to the first switching node, the packets arriving at the switching nodes from at least a subset of the plurality of gateway nodes according to respective Equal Cost Multi Path (ECMP) routing paths.

9. The SDN controller as recited in claim 8, wherein the program instructions further comprise instructions configured to program the switching nodes by sending one or more OpenFlow specification match-action rules that identify the first switching node as a destination node.

10. The SDN controller as recited in claim 8, wherein the program instructions further comprise instructions configured to:
determine that the subscriber session has terminated; and
responsive to the determination that the subscriber session has terminated, instruct the switching nodes to inactivate the match-action rules with respect to the packet flow associated with the subscriber session.

11. The SDN controller as recited in claim 8, wherein the n-tuple identifier set comprises at least one of: a source IP address, a source port number, a destination IP address, a destination port number and a protocol in use.

12. The SDN controller as recited in claim 8, wherein the program instructions further comprise instructions configured to determine that the packet flow requires flow stickiness responsive to receiving a subscriber service policy message regarding the subscriber session.

13. The SDN controller as recited in claim 8, wherein the program instructions further comprise instructions configured to perform a statistical analysis of the packet flow to determine that the packet flow requires flow stickiness.

14. A method operating at a switching node of a data center having a plurality of switching nodes coupled in a data center network fabric to a plurality of gateway nodes and controlled by a Software Defined Networking (SDN) controller, the method comprising:
forwarding first packets of new packet flows received at the switching node to the SDN controller, the first packets each containing respective n-tuple identifier sets of corresponding packet flows and flowing from one or more gateway nodes pursuant to respective subscriber sessions via an external network;
populating a flow identification database for identifying the new packet flows as they arrive at the switching node;
receiving packets at the switching node for a particular packet flow pursuant to a subscriber session via an external network, the particular packet flow having a particular n-tuple identifier set;
determining that the particular packet flow is not a new packet flow by comparing the particular n-tuple identifier set of the particular packet flow against the flow identification database;
responsive to the determining, applying a programming rule provided by the SDN controller with respect to the particular packet flow, the programming rule operating to identify a destination switching node other than the switching node receiving the particular packet flow; and
redirecting the packets of the particular packet flow to the destination switching node identified according to the programming rule.

15. The method as recited in claim 14, wherein the packets of the particular packet flow are received from a gateway node according to an Equal Cost Multi Path (ECMP) path.

16. The method as recited in claim 14, wherein the programming rule comprises at least one match-action rule provided by the SDN controller according to OpenFlow specification.

17. The method as recited in claim 14, wherein each n-tuple identifier set comprises at least one of: a source IP address, a source port number, a destination IP address, a destination port number and a protocol in use.

18. The method as recited in claim 14, further comprising: deleting an entry in the flow identification database responsive to at least one of a command from the SDN controller, reaching a timeout value, and determining that the subscriber session has terminated.

19. A switching node associated with a data center having a plurality of gateway nodes and a plurality of switching nodes coupled in a data center network fabric and controlled by a Software Defined Networking (SDN) controller, the switching node comprising:
one or more processors; and
a persistent memory module coupled to the one or more processors and having program instructions thereon, which perform the following when executed by the one or more processors:
forward first packets of new packet flows received at the switching node to the SDN controller, the first packets each containing respective n-tuple identifier sets of corresponding packet flows and flowing from one or more gateway nodes pursuant to respective subscriber sessions via an external network;
populate a flow identification database for identifying the new packet flows as they arrive at the switching node;
receive packets at the switching node for a particular packet flow pursuant to a subscriber session via an external network, the particular packet flow having a particular n-tuple identifier set;
determine that the particular packet flow is not a new packet flow by comparing the particular n-tuple identifier set of the particular packet flow against the flow identification database;
responsive to the determining, apply a programming rule provided by the SDN controller with respect to the particular packet flow, the programming rule operating to identify a destination switching node other than the switching node receiving the particular packet flow; and
redirect the packets of the particular packet flow to the destination switching node identified according to the programming rule.

20. The switching node as recited in claim 19, wherein the packets of the particular packet flow are received from a gateway node according to an Equal Cost Multi Path (ECMP) path.

21. The switching node as recited in claim 19, wherein the programming rule comprises at least one match-action rule provided by the SDN controller according to OpenFlow specification.

22. The switching node as recited in claim 19, wherein each n-tuple identifier set comprises at least one of: a source IP address, a source port number, a destination IP address, a destination port number and a protocol in use.

23. The switching node as recited in claim 19, further comprising program instructions for deleting an entry in the flow identification database responsive to at least one of a command from the SDN controller, reaching a timeout value, and determining that the subscriber session has terminated.

* * * * *